US011123657B1

(12) United States Patent
Meher et al.

(10) Patent No.: US 11,123,657 B1
(45) Date of Patent: Sep. 21, 2021

(54) AUXILIARY BAFFLE FOR A GREASE INTERCEPTOR AND A GREASE INTERCEPTOR INCORPORATING THE SAME

(71) Applicant: CANPLAS INDUSTRIES LTD., Barrie (CA)

(72) Inventors: Jack Robert Meher, Minesing (CA); James Brian Mantyla, Barrie (CA); Rachel Catherine Elaine Beaulieu, Angus (CA)

(73) Assignee: CANPLAS INDUSTRIES LTD.

( * ) Notice: Subject to any disclaimer, the term of this patent is extended or adjusted under 35 U.S.C. 154(b) by 0 days.

(21) Appl. No.: 16/998,027

(22) Filed: Aug. 20, 2020

(30) Foreign Application Priority Data

Jul. 2, 2020 (CA) .................................. CA 3085262

(51) Int. Cl.
*E03F 5/16* (2006.01)
*B01D 17/02* (2006.01)
(Continued)

(52) U.S. Cl.
CPC ...... *B01D 17/0211* (2013.01); *B01D 17/0214* (2013.01); *C02F 1/40* (2013.01);
(Continued)

(58) Field of Classification Search
CPC ... B01D 17/0211; B01D 17/0214; C02F 1/40; E03F 5/16
(Continued)

(56) References Cited

U.S. PATENT DOCUMENTS 2,003,140 A 5/1935 Dehn
2,090,813 A 8/1937 Schumacher
(Continued)

FOREIGN PATENT DOCUMENTS

CA 2299134 C 9/2009
CA 2672865 C 7/2012
CA 2769800 A1 8/2013

*Primary Examiner* — Christopher Upton
(74) *Attorney, Agent, or Firm* — Hoffmann & Baron, LLP

(57) ABSTRACT

An in-line grease interceptor assembly adapted to separate fat, oil, and grease (FOG) out from wastewater mixed with FOG. The assembly has an inlet for receiving wastewater mixed with FOG, an outlet for discharging wastewater after at least some FOG has been separated out from the wastewater, and a chamber hydraulically located between the inlet and the outlet. The chamber has lateral sides, a floor, and an open top, and is adapted to maintain the mixed wastewater in the chamber at a predetermined liquid level located below the open top while accumulating the separated FOG in a layer above the predetermined liquid level. An auxiliary baffle is positioned inside the chamber, extending from a downstream end toward an upstream end of the chamber, between the floor and the open top. The auxiliary baffle has a downstream end, an upstream end, and lateral sides, and defines a first separation section above the auxiliary baffle, and a second separation section below the auxiliary baffle. One or more water directors are also positioned in the chamber to provide a sinuous flow path for the mixed wastewater through the chamber from the inlet to the outlet via the first separation section, and the second separation section. The auxiliary baffle is sized, shaped and positioned in the chamber to substantially block the separated FOG in the first separation section from entering the second separation section. A method of preventing FOG being carried out with wastewater mixed with FOG from a food preparation establishment to a sewer system is also disclosed.

47 Claims, 14 Drawing Sheets

(51) Int. Cl.
*C02F 1/40* (2006.01)
*C02F 103/32* (2006.01)
*C02F 101/32* (2006.01)

(52) U.S. Cl.
CPC ............ *E03F 5/16* (2013.01); *C02F 2101/32* (2013.01); *C02F 2103/32* (2013.01)

(58) Field of Classification Search
USPC .................... 210/801, 519, 521, 538, 540
See application file for complete search history.

(56) References Cited

U.S. PATENT DOCUMENTS

| | | | |
|---|---|---|---|
| 2,102,430 A | | 12/1937 | McLeod |
| 2,109,430 A | | 2/1938 | Markle, Jr. |
| 2,138,985 A | | 12/1938 | Seestedt et al. |
| 2,216,300 A | | 10/1940 | Shenk |
| 2,272,912 A | | 2/1942 | Heinkel |
| 2,285,893 A | | 6/1942 | Boosey |
| 2,414,949 A | | 1/1947 | Hirshstein |
| 2,638,177 A | | 5/1953 | Heindlhofer |
| 2,825,422 A | | 3/1958 | Schoenfeld |
| 3,754,656 A | | 8/1973 | Horiguchi et al. |
| 3,804,252 A | * | 4/1974 | Rishel ............... B01D 17/0214 210/800 |
| 3,847,814 A | | 11/1974 | Adachi |
| 3,849,311 A | | 11/1974 | Jakubek |
| 3,933,654 A | | 1/1976 | Middelbeek |
| 4,059,517 A | | 11/1977 | Strahorn et al. |
| 4,073,734 A | * | 2/1978 | Lowrie ............. B01D 17/0208 210/540 |
| 4,111,805 A | | 9/1978 | Van Pool et al. |
| 4,113,617 A | | 9/1978 | Bereskin et al. |
| 4,132,651 A | | 1/1979 | deJong |
| 4,132,652 A | | 1/1979 | Anderson et al. |
| 4,940,539 A | | 7/1990 | Weber |
| 4,957,633 A | | 9/1990 | Suutarinen |
| 5,030,357 A | | 7/1991 | Lowe |
| 5,271,853 A | | 12/1993 | Batten |
| 5,431,826 A | | 7/1995 | Becker et al. |
| 5,505,860 A | | 4/1996 | Sager |
| 5,520,825 A | | 5/1996 | Rice |
| 5,538,631 A | | 7/1996 | Yeh |
| 5,637,221 A | | 6/1997 | Coyne |
| 5,662,804 A | | 9/1997 | Dufour |
| 5,714,069 A | | 2/1998 | Sager |
| 6,120,684 A | | 9/2000 | Kistner et al. |
| 6,517,715 B1 | | 2/2003 | Batten et al. |
| 6,951,615 B2 | | 10/2005 | Tripodi et al. |
| 7,011,752 B2 | | 3/2006 | Broeders et al. |
| 7,296,694 B2 | | 11/2007 | Weymouth |
| 7,300,588 B2 | | 11/2007 | Broeders et al. |
| 7,361,282 B2 | | 4/2008 | Smullin |
| 7,427,356 B2 | | 9/2008 | Chapin |
| 7,452,472 B2 | | 11/2008 | Hodgekins et al. |
| 7,481,321 B2 | | 1/2009 | Ismert |
| 7,686,961 B1 | | 3/2010 | Glynne |
| 7,972,518 B2 | | 7/2011 | Ralph et al. |
| 8,007,016 B2 | | 8/2011 | Mantyla et al. |
| 8,017,004 B2 | | 9/2011 | Crumpler |
| 8,915,380 B2 | | 12/2014 | Sowerby et al. |
| 8,920,640 B2 | * | 12/2014 | Jauncey ................... C02F 1/40 210/521 |
| 9,415,329 B2 | | 8/2016 | Bird et al. |
| 9,550,686 B2 | | 1/2017 | MacDougall |
| 9,828,759 B2 | | 11/2017 | Bird et al. |
| 9,850,651 B2 | | 12/2017 | Bird et al. |
| 9,932,247 B1 | * | 4/2018 | Batten ................ B01D 17/0211 |
| 2011/0315617 A1 | | 12/2011 | Duran et al. |
| 2013/0221545 A1 | | 8/2013 | Bird et al. |
| 2013/0313180 A1 | | 11/2013 | Bird et al. |
| 2014/0150877 A1 | * | 6/2014 | Batten ....................... E03F 5/16 137/1 |

* cited by examiner

AUXILIARY BAFFLE FOR A GREASE INTERCEPTOR AND A GREASE INTERCEPTOR INCORPORATING THE SAME

CROSS REFERENCE TO RELATED APPLICATION

This application claims the benefit of priority to Canadian Application No. 3085262 filed on Jul. 2, 2020. The entire contents of the aforementioned application are incorporated herein by reference in its entirety.

FIELD OF THE INVENTION

The present invention relates generally to the field of wastewater management and in particular to grease interceptors of the type which are used on wastewater outflows from, for example, commercial food establishments. Grease interceptors are typically used to prevent fats, oils and grease (FOG) from entering the sanitary sewage system. In particular this invention relates to a baffle for use in such a grease interceptor, and to a grease interceptor incorporating such a baffle.

BACKGROUND OF THE INVENTION

In many food preparation facilities, such as commercial kitchens and restaurants, the sink is a major tool used for disposing of various types of food waste. In some cases liquid food wastes, such as fats, oils and grease ("FOG") are poured down the sink, and in other cases a mechanical chopper such as a garburator is used to shred the food waste as it leaves the sink and enters the wastewater system. Many food preparation establishments, such as commercial restaurants and the like, have multiple sinks for such food waste disposal. In many jurisdictions, the disposal from commercial kitchens of FOG and FOG laden debris into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are connected to the wastewater effluent stream from the food preparation kitchen or other facility and are located before the sanitary sewer, typically within the kitchen. The grease interceptors may take a number of forms, but typically consist of an in-line container which is mounted at or below grade within the wastewater discharge system downstream of all of the sinks and the like. The container includes features that are configured to allow fats, oils and grease to float to the surface of the container where they can be physically removed for controlled disposal. In this way these wastes are removed from the wastewater before the wastewater enters the sanitary sewer system. Some examples of prior art grease interceptors include the following: Canadian Patent Nos. 2,299,134; and 2,672,865; U.S. Pat. Nos. 2,272,912; 2,102,430; 4,940,539; 5,431,826; 7,011,752; 7,300,588; 8,007,016; and 9,415,329.

While these different inventions all have various features and benefits, a consistent problem is efficiently separating FOG from wastewater. Baffles and deflector plates have been used to attempt to increase separation of grease, but the prior art baffles and deflector plates may not create sufficient separation of FOG from wastewater. Moreover, prior art baffles and deflector plates which are fixed to the grease interceptor surface may be difficult to clean. Attempts to increase separation of FOG by radically modifying the flow of wastewater may also have the undesirable effect of creating turbulent flow, which can erode trapped grease from the surface and cause FOG to enter the sanitary sewer system.

For example, U.S. Pat. No. 7,300,588 to Broeders discloses a wastewater separator for separating light waste from a mixed wastewater stream, having, among other things, a wastewater stream director in the container, which is sized, shaped and positioned to direct the wastewater stream along a preferred flow path which is generally diagonal across the container to facilitate separation of the light waste. The preferred flow path has a first section in the container, as well as a second section. The separation of the light waste from the wastewater stream takes place in the first section. The first section extends upward from the downstream end of the flow-directing inlet baffle and away from the wastewater inlet toward the collection area at the surface of the water contained in the container. Such a flow path maximizes and optimizes the flow path length and hence the time for buoyancy separation of light waste, thus enhancing the amount of separation of light waste. Although, the Broeders wastewater separator generally yields excellent results, there is the potential for the upwardly directed wastewater stream becoming turbulent and causing the undesirable effect of eroding some of the FOG already trapped at the surface, allowing some of the eroded FOG to re-enter the wastewater stream in the second section, and escape out of the wastewater separator into the sanitary sewer system.

As another example, U.S. Pat. No. 3,933,654 to Middelbeek discloses an oil separator for separating oil from an oil laden liquid. The Middelbeek device has a tank with an inlet and an outlet in opposite side walls. Two parallel inclined plates are positioned between the inlet and the outlet to define a tortuous path for the liquid. One of the two plates is positioned adjacent the inlet, and has one edge secured to the inlet wall to define a space to minimize the turbulence of the incoming liquid. The liquid to be purified enters the device through the inlet and is directed diagonally upwards to the surface of the water contained in the tank, by the first inclined plate, before turning diagonally downwards between the first inclined plate and the second inclined plate. The liquid continues to flow under the second inclined plate and over a vertical baffle before being discharged out of the tank through the outlet. As in the Broeders wastewater separator, there is also the potential in the Middlebeck device for the upwardly directed liquid to become turbulent and cause the undesirable effect of eroding some of the oil already trapped at the surface of the water contained in the tank, allowing some of the eroded oil to re-enter the flowing liquid, and escape out of the device into the sanitary sewer system.

U.S. Pat. No. 2,090,813 to Schumacher discloses an apparatus for separating mixtures of liquids of different specific gravity. The Schumacher apparatus comprises a container having an inlet at the upper end of the container, and an outlet, also at the upper end of the container but at a horizontal distance from the inlet. The container is subdivided by horizontal surfaces positioned one above the other so that the mixture entering from the inlet at the upper end of the container describes a long zig-zag path downwards the bottom of the container during which the separation takes place, and then back up to the outlet at the upper end of the container. Since the mixture enters the container and flows horizontally under the surface of the liquid along the junction between the layers of oil and water, there is potential for some of the already trapped oil being eroded from the junction, and re-entering the flowing liquid.

Another problem with the Schumacher apparatus is that it relies on a series of horizontal flow paths to perform the separation. However, horizontal flow paths are inefficient for buoyancy separation, as disclosed, for example, in U.S. Pat. No. 7,300,588 to Broeders, which teaches that a diagonal flow path maximizes and optimizes the flow path length in a grease interceptor and hence the time for buoyancy separation of light waste, thus enhancing the amount of separation of light waste.

Other examples include those disclosed in U.S. Pat. Nos. 2,109,430; 2,138,985; 2,216,300; 2,638,177; 2,825,422; 3,754,656; 3,847,814; 3,849,311; 4,059,517; 4,111,805; 4,132,651; 4,132,652; 4,957,633; 5,505,860; 5,520,825; 5,538,631; 5,637,221; 5,662,804; 6,517,715; 7,361,282; 7,972,518; 8,915,380; and 9,550,686.

Accordingly, there is a continuing need for improvements in grease interceptors.

SUMMARY OF THE INVENTION

What is desired is a means for controlling the flow of wastewater through a grease interceptor to efficiently separate fat, oil, and grease (FOG) from the wastewater without excessively turbulent flow, and without eroding previously trapped FOG. What is also desired is a means for providing for the separation of the FOG using a grease interceptor which can be cleaned more easily.

According to a preferred embodiment of the present invention, the grease interceptor comprises a tank, defining a chamber, with an open top. An inlet and an outlet are positioned at opposed upstream and downstream ends of the tank, and a lid is secured to the open top of the tank to close the chamber. Wastewater containing FOG mixed with water enters the inlet, and exits the outlet substantially free of the FOG.

Preferably, a plurality of water directors, including an inlet baffle, one or more ramps, and an outlet baffle, may be positioned inside the chamber, between the inlet and the outlet, to promote a flow of the mixed wastewater along a sinuous flow path, to enhance separation of the FOG from the mixed wastewater. The separated FOG rises upwardly in the chamber toward a predetermined liquid level, and accumulates to form a grease layer (also known as a "grease cake"), above the predetermined liquid level. The inlet baffle directs the mixed wastewater flowing into the chamber through the inlet, down to the bottom of the chamber to the one or more ramps, which redirect a high velocity flow of the wastewater upwardly into the grease layer. From there, the wastewater flows toward the outlet baffle at the downstream end of the chamber, which redirects the flow of the wastewater downwardly to an auxiliary baffle, located in the chamber. The auxiliary baffle redirects the flow of the wastewater back toward the upstream end of the chamber, before being redirected underneath the auxiliary baffle toward the downstream end. An opening defined by the outlet baffle at the downstream end allows the wastewater to pass through and continue on upwardly to the outlet, through which the wastewater exits the chamber substantially free of the FOG.

As the mixed wastewater flows along the sinuous flow path between the inlet and the outlet, the FOG is continually separating from the mixed wastewater and floating upwardly to the accumulating grease layer. The auxiliary baffle divides the chamber into two separation sections to promote grease interceptor efficiency. The second separation section below the auxiliary baffle is shielded by the auxiliary baffle from the FOG separating from the wastewater in the first separation section, as well as the FOG that is being re-emulsified from the accumulating grease layer during the ongoing inflow of the mixed wastewater into the chamber.

Preferably, the auxiliary baffle may be V-shaped in cross section, and extend from the outlet baffle at the downstream end, across a major portion of the chamber, toward the upstream end. Additionally, the preferred auxiliary baffle may include voids, such as gaps, spaces or recesses, at its lateral sides to form openings between the auxiliary baffle and the lateral sides of the tank. The openings are sized and shaped to allow a) water to pass down through them from the first separation section to the second separation section below the auxiliary baffle, and b) FOG to pass up through them from the second separation section to the first separation section above the auxiliary baffle.

Without being bound by any particular theory, it is believed that the auxiliary baffle promotes the separation of FOG that flows in, or separates out, underneath the auxiliary baffle by directing the separated FOG to the lateral sides of the tank, and upwardly through the voids, to the accumulating FOG layer. In the portion of the sinuous flow path underneath the auxiliary baffle, the mixed wastewater moves slow enough that the separated FOG can move toward the lateral sides of the chamber following the upwardly sloped contours of the auxiliary baffle. Accordingly, by directing the FOG toward the lateral sides in the second separation section with the auxiliary baffle, the rising FOG will be less likely to be intercepted by the wastewater flowing along the sinuous flow path in the first separation section, and carried with it to the second separation section. Additionally, by concentrating the sinuous flow path away from the lateral sides in the first separation section, also with the auxiliary baffle, the rising FOG may be even less likely to be intercepted by the wastewater flowing along the sinuous flow path in the first separation section, and carried with it to the second separation section.

Preferably the auxiliary baffle may be configured to direct the separated FOG in the second separation section away from the sinuous flow path in the first separation section, and even more preferably, the auxiliary baffle may also shape the portion of the sinuous flow path in the first separation section so that it is concentrated away from the separated FOG rising through the voids from the second separation section in a column toward the accumulating FOG layer.

Although the auxiliary baffle has a V-shape in cross-section, according to preferred embodiments of the invention, it is contemplated that the auxiliary baffle may have other cross-sectional shapes, including flat, U-shaped, W-shaped, inverted V-shaped, inverted U-shaped, inverted W-shaped, and the like. All such embodiments are comprehended by the present invention.

Therefore, in accordance with one aspect of the present invention, there is disclosed an in-line grease interceptor assembly adapted to separate fat, oil, and grease (FOG) out from wastewater mixed with said FOG, said assembly comprising:

an inlet for receiving said wastewater mixed with said FOG;

an outlet for discharging said wastewater after at least some FOG has been separated out from said mixed wastewater;

a chamber hydraulically located between said inlet and said outlet, said chamber having lateral sides, a floor, and an open top, and being adapted to maintain said mixed wastewater in said chamber at a predetermined liquid level located below said open top while accumulating said separated FOG in a layer above said predetermined liquid level;

an auxiliary baffle positioned inside said chamber, extending from a downstream end of said chamber toward an upstream end of said chamber, between said floor and said open top, said auxiliary baffle having a downstream end, an upstream end, an underside, and lateral sides, and defining a first separation section above said auxiliary baffle, and a second separation section below said auxiliary baffle; and one or more water directors positioned in said chamber to provide a sinuous flow path for said mixed wastewater through said chamber from said inlet to said outlet via said first separation section, and said second separation section;

wherein said auxiliary baffle is sized, shaped and positioned in said chamber to substantially block said separated FOG in said first separation section from entering said second separation section.

It is contemplated that at least some FOG remaining in said mixed wastewater in said second separation section is allowed to separate out from said mixed wastewater in said second separation section, and that said auxiliary baffle may be adapted to allow said separated FOG in said second section to pass through at least one portion of said auxiliary baffle, from said second separation section to said first separation section.

It is also contemplated that said auxiliary baffle may be adapted to direct a portion of said sinuous flow path in said first separation section away from said separated FOG passing through said at least one portion of said auxiliary baffle and rising upwardly to said accumulating FOG layer.

In accordance with another aspect of the present invention, there is disclosed a method of preventing fat, oil, and grease (FOG) being carried out with wastewater mixed with said FOG from a food preparation establishment to a sewer system, said method comprising the steps of:

receiving said mixed wastewater in a chamber through an inlet at an upstream end of said chamber, said chamber having lateral sides, a floor and an open top, and being adapted to maintain said mixed wastewater at a predetermined liquid level located below said open top while accumulating said separated FOG in a layer above said predetermined liquid level;

positioning an auxiliary baffle inside said chamber, extending from a downstream end of said chamber toward an upstream end of said chamber, between said floor and said open top, said auxiliary baffle having a downstream end, an upstream end, and lateral sides, and defining a first separation section above said auxiliary baffle, and a second separation section below said auxiliary baffle;

directing said mixed wastewater through said chamber along a sinuous flow path from said inlet to an outlet, via said first separation section and said second separation section;

allowing at least some of said FOG to separate from said mixed wastewater in said first separation section to accumulate in said layer above said predetermined liquid level;

blocking said separated FOG in said first separation section from entering said second separation section with said auxiliary baffle;

directing said mixed wastewater from said second separation section toward said outlet at said downstream end of said chamber; and discharging said mixed wastewater through said outlet, after at least some of said FOG has been separated out from said mixed wastewater.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
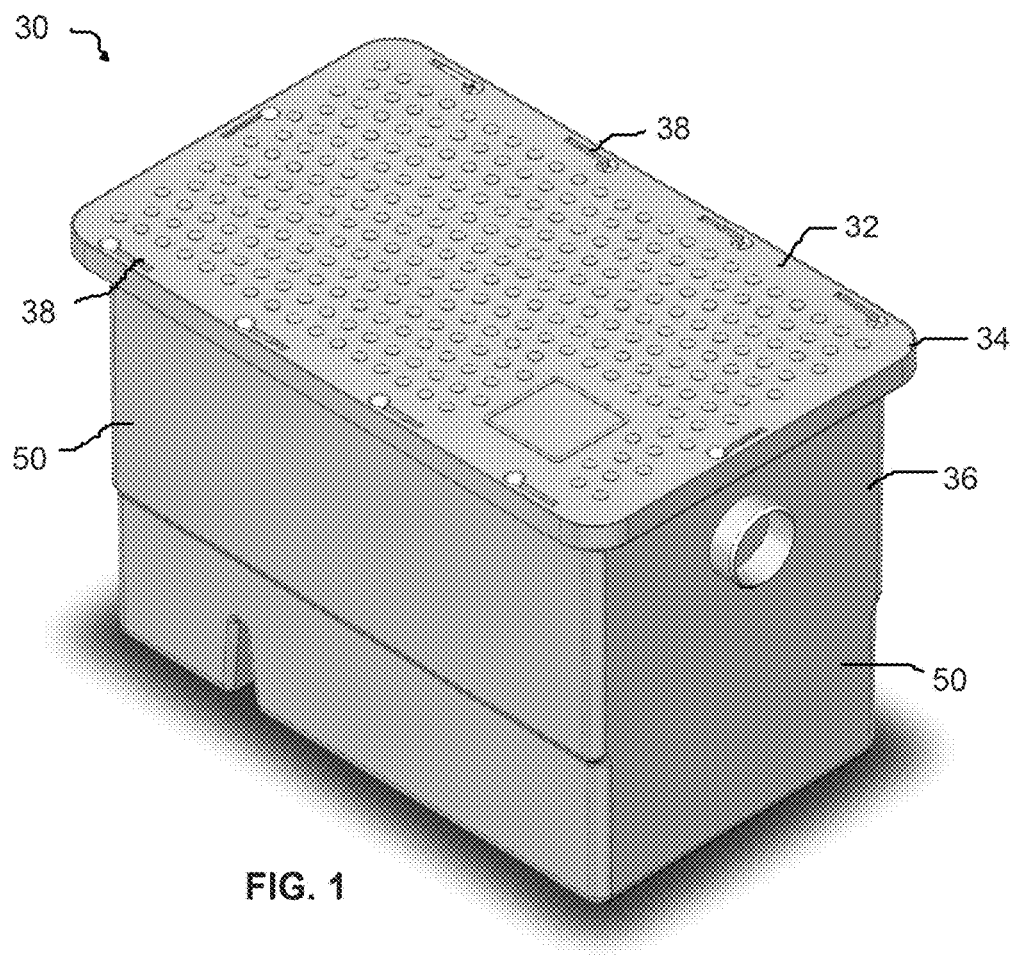
FIG. 1 is a perspective view of a grease interceptor having a tank and a lid, according to an embodiment of the present invention.

An in-line wastewater grease interceptor 30 according to an embodiment of the present invention is shown in FIG. 1. As shown, the grease interceptor 30 has a lid 32 releasaby attached to the top of a tank 36. Preferably, the lid 32 may be secured to the top 34 of the tank 36 with a plurality of latch assemblies 38. The grease interceptor 30 and its component parts may preferably be made from plastic, metal, or combinations thereof. Most preferably, however, the grease interceptor 30 and its component parts may be molded from plastic, such as, Polyvinyl chloride (PVC), Polyethylene (PE) of varying densities, Polypropylene (PP), Polyethylene cross-linked (PEX), and Xenoy® resins (SABIC Plastics Canada Inc., Ontario, Canada), including glass filled variants thereof.

Figure 2:
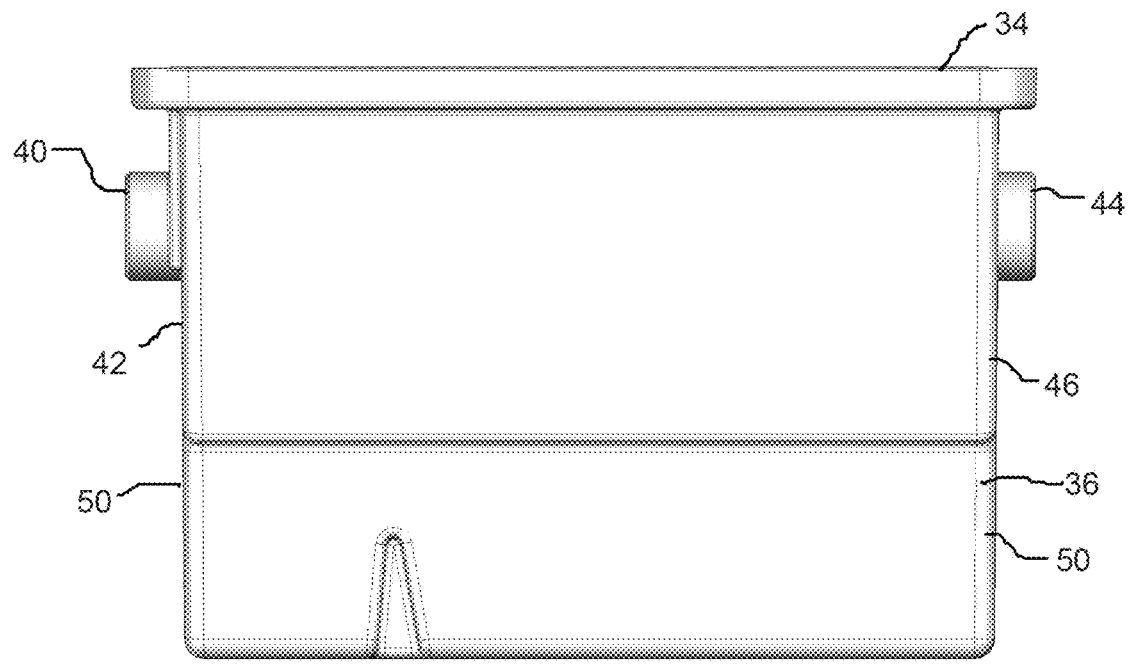
FIG. 2 is a side view of the grease interceptor of FIG. 1.

As best seen in FIG. 2, the tank 36 has an inlet 40 located at an upstream end 42 of the tank 36, and an outlet 44 located at a downstream end 46 of the tank 36. The tank 36 defines a chamber 48 hydraulically located between the inlet 40 and the outlet 44. The inlet 40 and outlet 44 are sized, shaped, and configured for connection to plumbing systems in a known manner.

Figure 3:
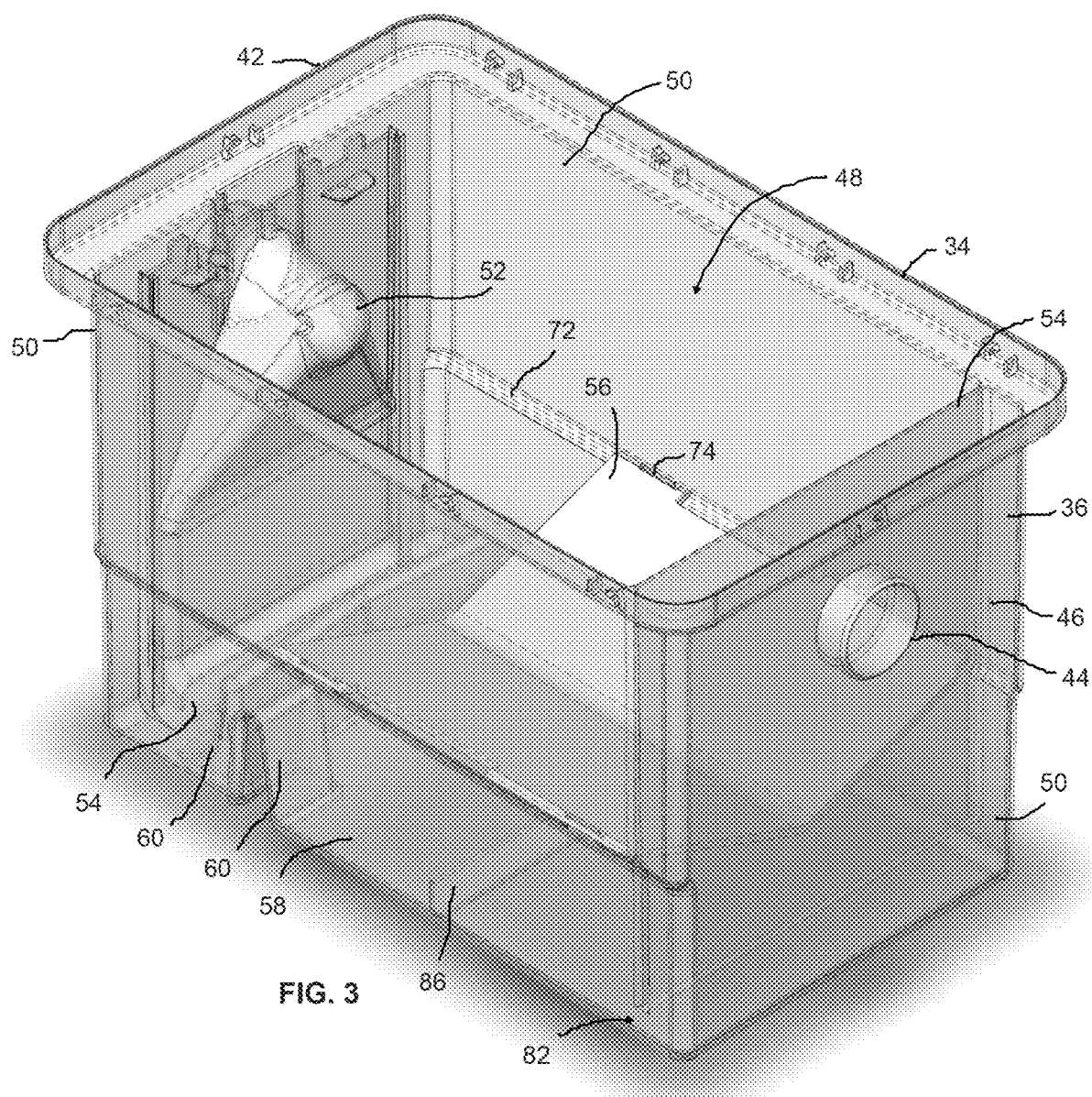
FIG. 3 is a perspective view of the grease interceptor of FIG. 1, with the lid removed, and the walls of the tank transparent to show the interior of the tank, including an inlet baffle, an outlet baffle, and an auxiliary baffle extending therebetween.

Turning now to FIG. 3, the grease interceptor 30 is illustrated with the lid 32 removed and the walls 50 of the tank 36 being transparent to show the interior of the tank 36, including an inlet baffle 52, an outlet baffle 54, and an auxiliary baffle 56 extending therebetween, from the downstream end 46 toward the upstream end 42.

In this example, the tank 36 has a width of about 50.94 cm, a length of about 84.82 cm, and a height of about 57.34 cm, and the inlet 40 and outlet 44 each have a diameter of 10.20 cm. The centers of the inlet 40 an outlet 44 are about 44.80 cm above the floor 58 of the tank 36. Preferably, the centers of the inlet 40 and outlet 44 may be between about 5 cm and about 25 cm, inclusive, below the top 34 of the tank 36, depending on design criteria.

Figure 4:
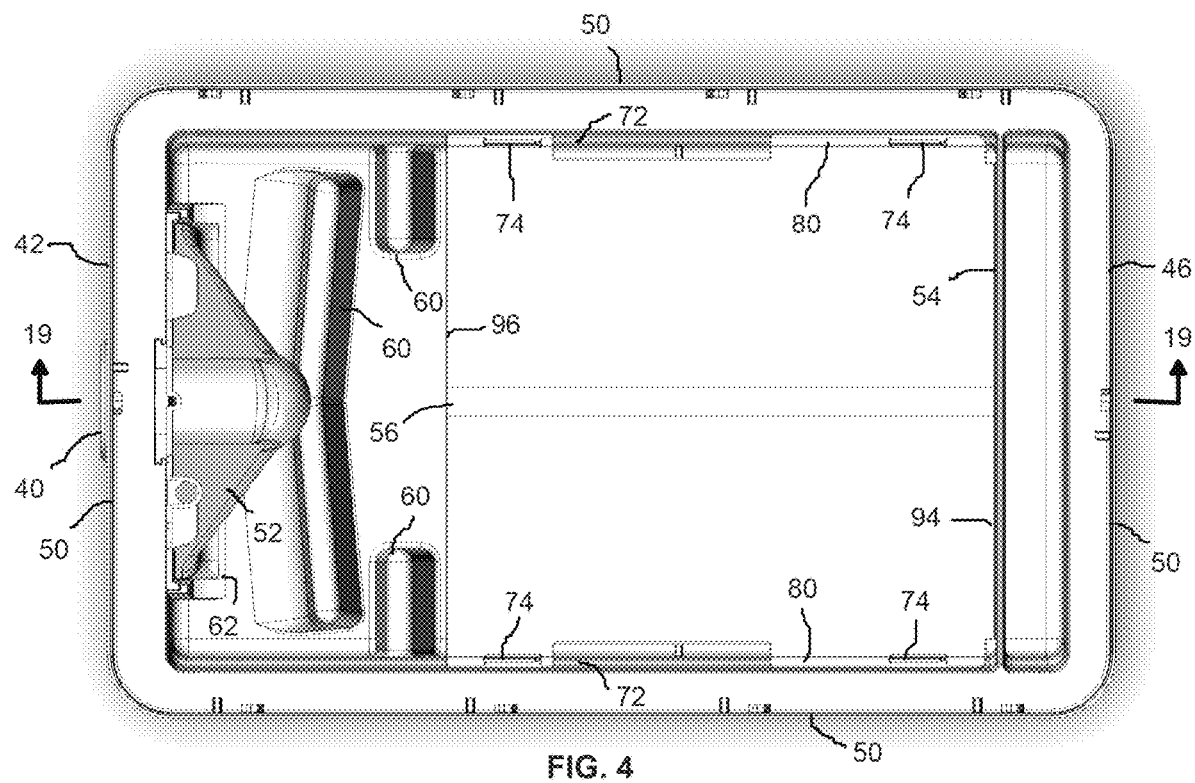
FIG. 4 is a top view of the grease interceptor of FIG. 3.
Figure 5:
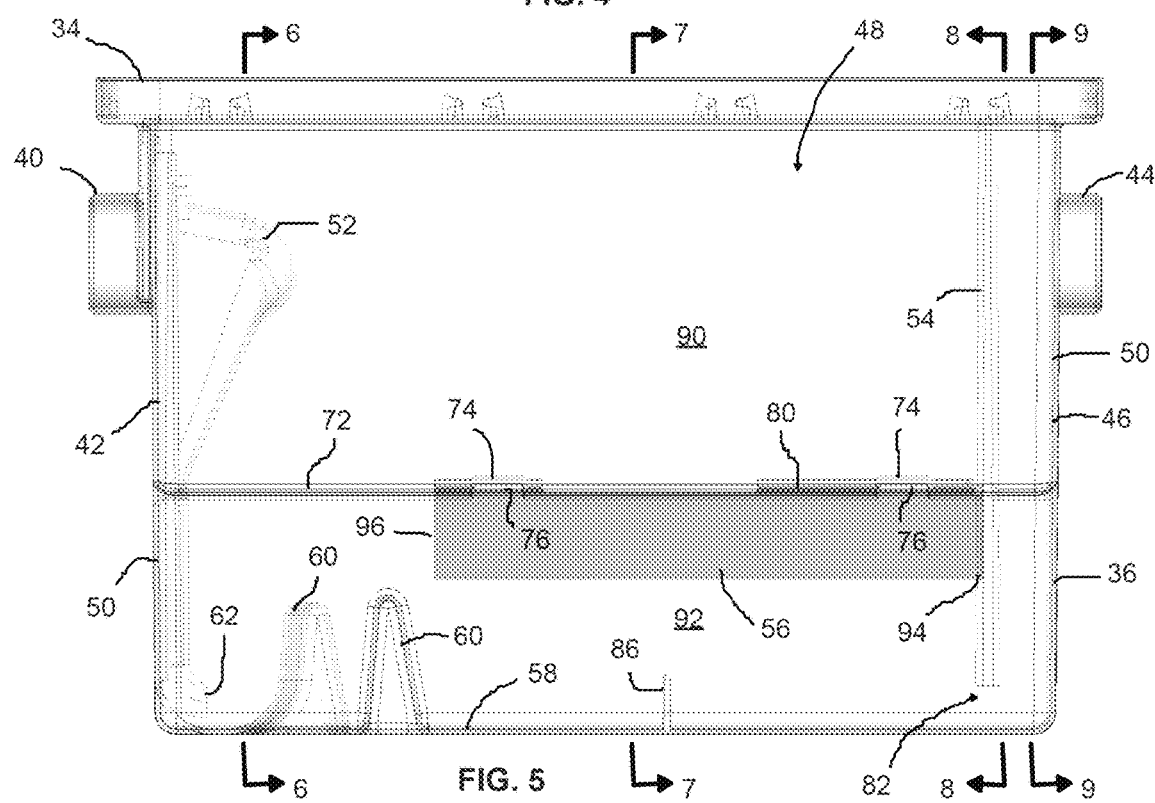
FIG. 5 is a side view of the grease interceptor of FIG. 4.
Figure 6:
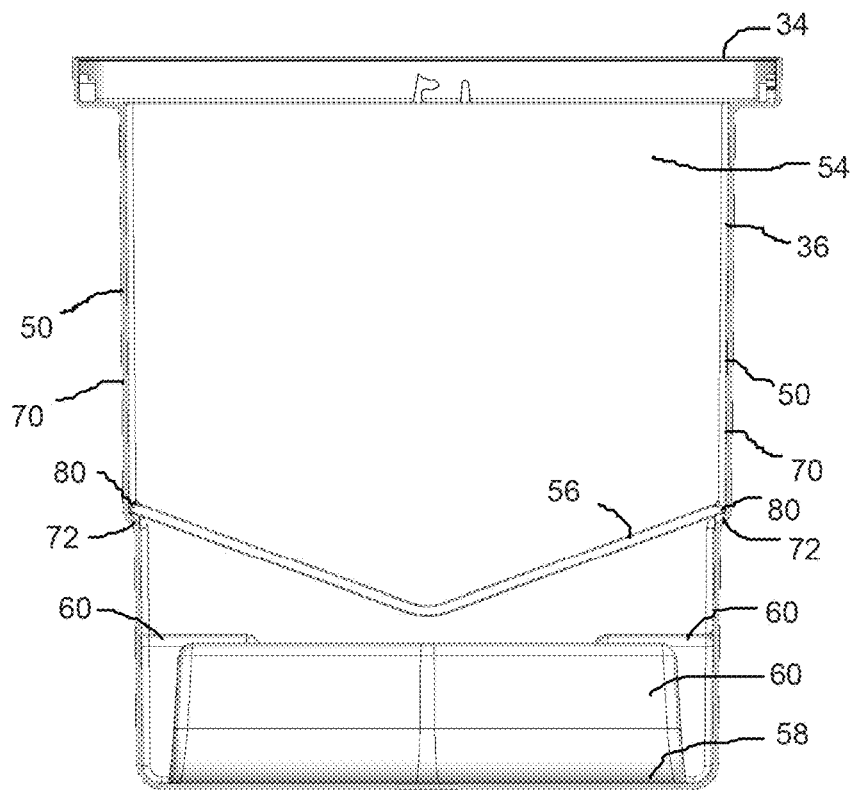
FIG. 6 is a cross-sectional view of the grease interceptor of FIG. 5 taken along line 6-6.

With reference to FIGS. 4 and 5, the inlet baffle 52 is configured to receive wastewater mixed with fat, oil, and grease (FOG) flowing into the tank 36 through the inlet 40 and redirect a high velocity flow of the mixed wastewater downwardly to the floor 58 of the tank 36. Preferably, the inlet baffle 52 may be removably attached to the upstream wall 50 inside of the tank 36 to allow the inlet baffle 52 to be removed and cleaned, and to allow for cleaning or removing any obstructions caught in the inlet 40.

Figure 19:
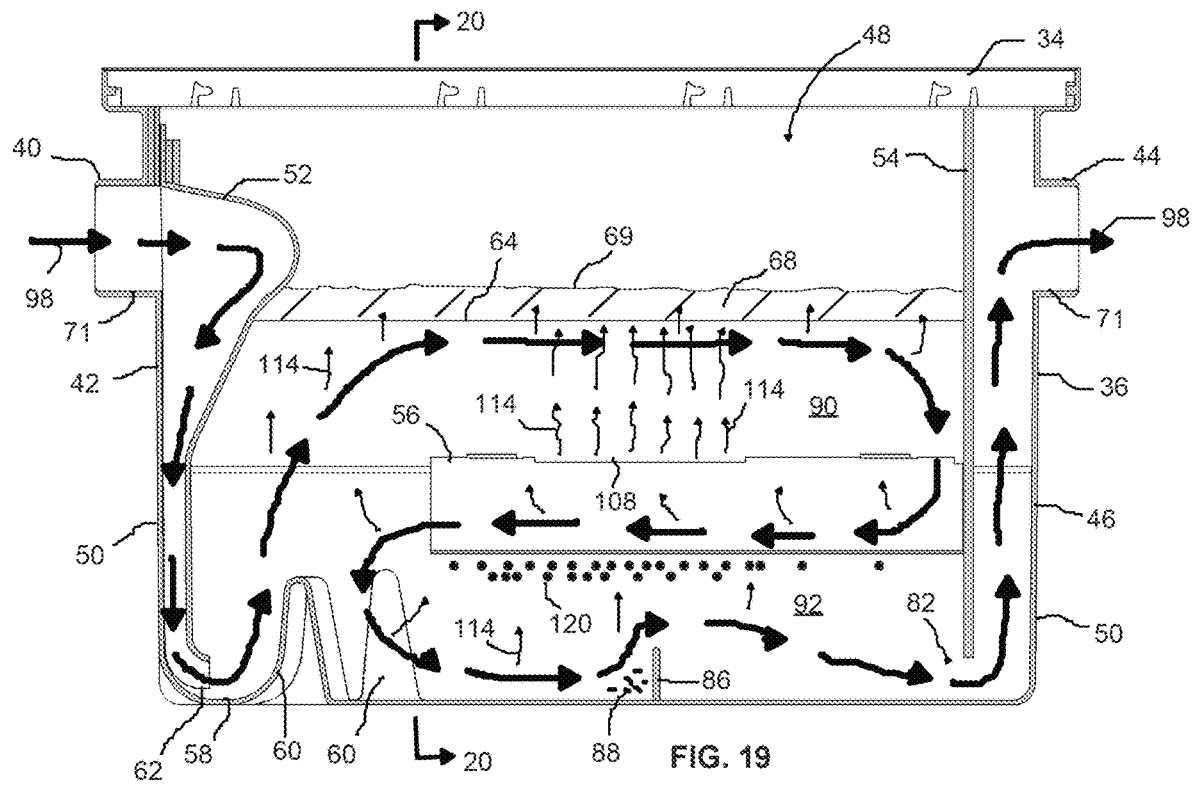
FIG. 19 is a cross-sectional view of the grease interceptor of FIG. 4, taken along line 19-19.
Figure 20:
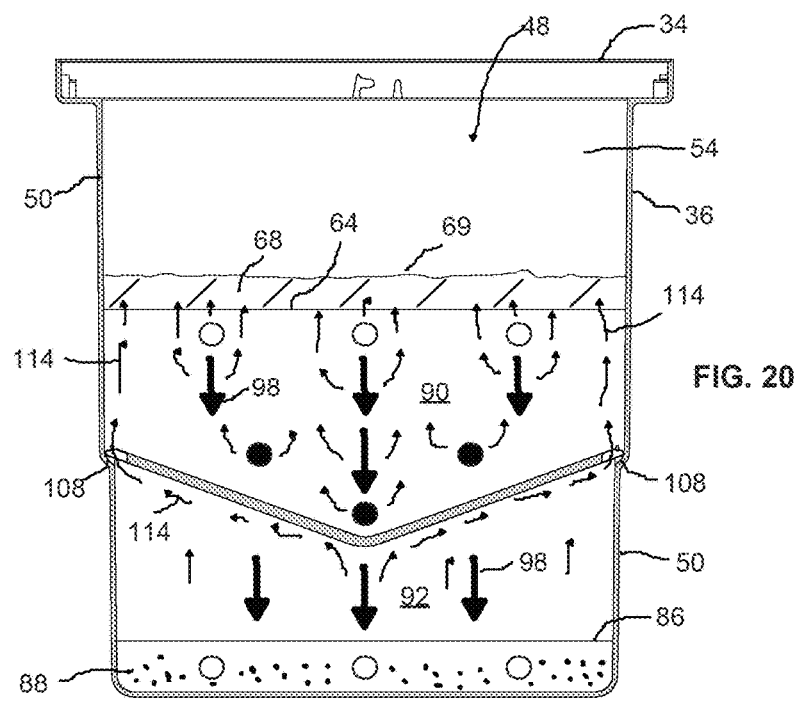
FIG. 20 is a cross-sectional view of the grease interceptor of FIG. 19, taken along line 20-20.

Preferably, the tank 36 includes one or more ramps 60 on the floor 58 of the chamber 48, positioned at the upstream end 42 to receive the redirected mixed wastewater being discharged from the outlet end 62 of the inlet baffle 52. The one or more ramps 60 are configured to redirect the mixed wastewater discharged from the outlet end 62 of the inlet baffle 52 upwardly from the floor 58 toward the top 34 of the tank 36. More preferably, the one or more ramps 60 redirect the mixed wastewater upwardly to the surface of the liquid 66, which is maintained at a predetermined level 64 in the chamber 48. The mixed wastewater is then redirected again at the predetermined level 64 to flow toward the downstream end 46 above the auxiliary baffle 56. The predetermined liquid level 64, and a separating FOG layer 68 accumulating above the predetermined liquid level 64, are located in the chamber 48 below the top 34 of the grease interceptor 30, as best seen in FIGS. 19 and 20. In this example, the predetermined liquid level 64 is slightly below the inlet 40 and the outlet 44, or about 37 cm above the floor 58 of the chamber 48. The top 69 of the FOG layer 68 defines the static water level, which typically rests at the level of the bottom 71 of the inlet 40 and the outlet 44. As will be appreciated, before the FOG layer 68 has begun to accumulate in the chamber 48, for example in a new installation, or after a cleaning, the predetermined liquid level 64 will be at the static water level. However, as the FOG layer 68 accumulates and grows, the predetermined liquid level 64 of the mixed wastewater will move downwardly in the chamber 48 from the static water level toward the floor 58. Accordingly, the predetermined liquid level 64 of the mixed wastewater changes over time during operation of the grease interceptor 30. Preferably, the predetermined liquid level 64 will be maintained within a range between the static water level and the highest portion of the auxiliary baffle 56.

Advantageously more than one ramp 60 may be provided as shown by way of example in FIGS. 4 and 5, and arranged to allow heavier waste to flow around the ramps 60, away from the outlet end 62 of the inlet baffle 52 to avoid clogging the outlet end 62. When arranged as shown in FIGS. 4 and 5, the mixed wastewater discharged from the outlet end 62 of the inlet baffle 52 will constantly be pushing the heavy waste away from the outlet end 62, and with an exit path provided between the ramps 60, the heavy waste can move downstream in the chamber 48, leaving the area of the ramps 60. It has been found that if an exit path is not provided for the inflow of heavy waste around the one or more ramps 60, the heavy waste may accumulate upstream of the ramps 60 and may back up into, and clog the outlet end 62 of the inlet baffle 52, which is not desirable. In this example, each ramp 60 has a height of about 12.33 cm, one main chevron-shaped ramp 60 being positioned about 13.46 cm upstream of the wall 50 at the upstream end 42, with its ends spaced apart from the lateral side walls 70, 70 of the tank 36. In this example, the space between the ends of the main ramp 60 and the lateral side walls 70, 70 is about 3.37 cm. Two additional, shorter ramps 60 (e.g. 10.24 cm long) are positioned about 22.07 cm upstream of the wall 50 at the upstream end 42, one on either side of the main ramp 60, and in overlapping relation with the ends of the main ramp 60.

Figure 14:
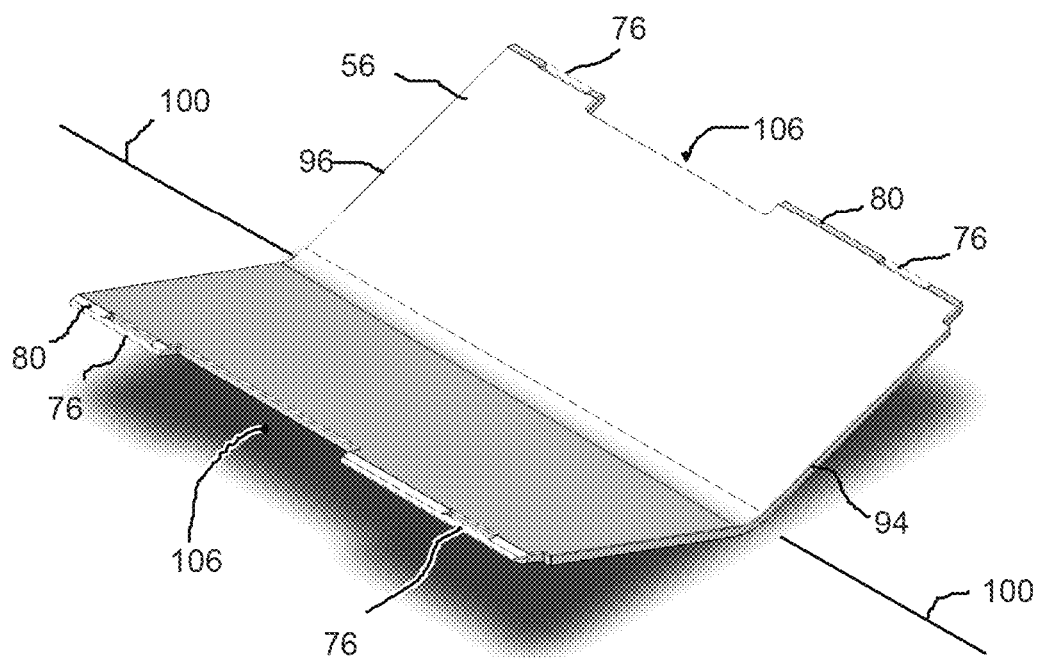
FIG. 14 is a perspective view of the auxiliary baffle of FIG. 3.
Figure 15:
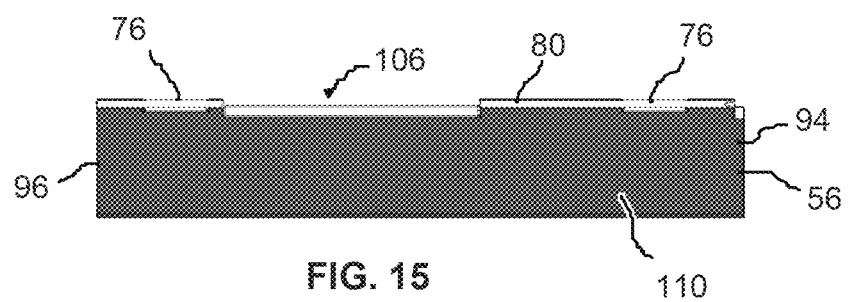
FIG. 15 is a side view of the auxiliary baffle of FIG. 14.
Figure 16:
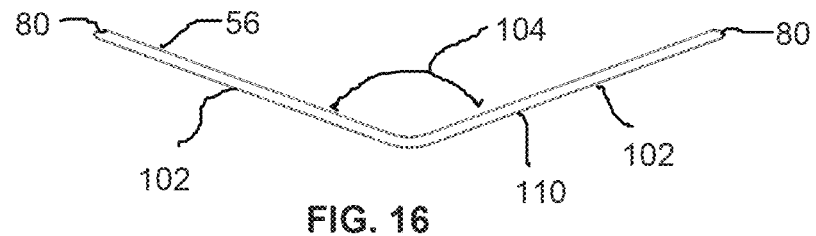
FIG. 16 is a front view of the auxiliary baffle of FIG. 14.

With reference to FIGS. 3 to 7, the opposed lateral side walls 70, 70 of the tank 36 preferably may include baffle supports inside the chamber 48 adapted to support the auxiliary baffle 56, and hold it in position in the chamber. Preferably, the baffle supports may include one or more projections, recesses, or the like located in the lateral side walls 70, 70 of the tank 36, which are sized and shaped to releasably engage the auxiliary baffle 56. By way of example, the baffle supports may include surfaces formed in the lateral side walls 70, 70, such as ledges 72 extending into the chamber 48 from the lateral side walls 70, 70 of the tank 36, for supporting the lateral sides 80, 80 of the auxiliary baffle 56. In this example, the ledges 72 are positioned about 23.36 cm above the floor 58 of the chamber 48, such that the lowest portion of the auxiliary baffle 56 (i.e. centerline 100 identified in FIG. 14) is positioned about 14.02 cm above the floor 58 of the chamber 48, and about 25.68 cm below the static water level.

More preferably, the tank 36 may include one or more retention tabs 74 extending from the ledges 72 for locating and retaining the auxiliary baffle 56 in place in the chamber 48 of the grease interceptor 30. Although four such retention tabs 74 are shown to be retaining the auxiliary baffle 56 in this example, more or fewer may be used depending on design constraints. Additionally, although the ledges 72 are shown to be continuous in this example, it is contemplated that the ledges may be discontinuous in other embodiments. Furthermore, the ledges 72 may be omitted altogether, in which case the auxiliary baffle 56 may be supported entirely by the retention tabs 74. All such embodiments are comprehended by the present invention.

Figure 17:
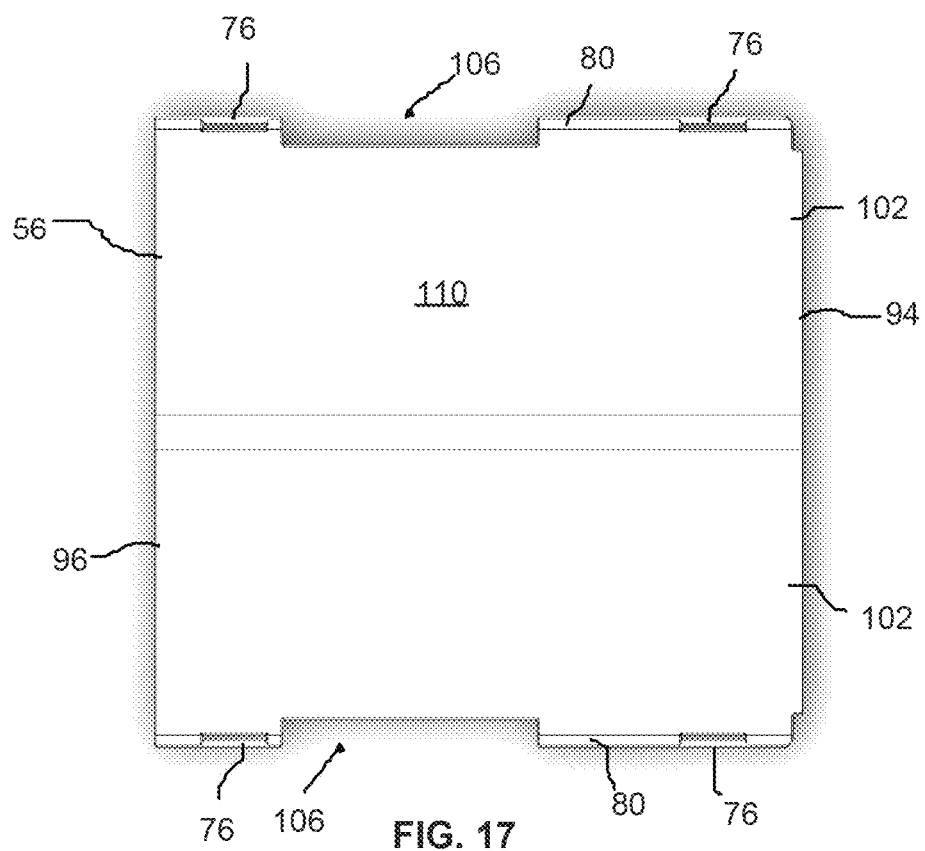
FIG. 17 is a top view of the auxiliary baffle of FIG. 14.
Figure 18:
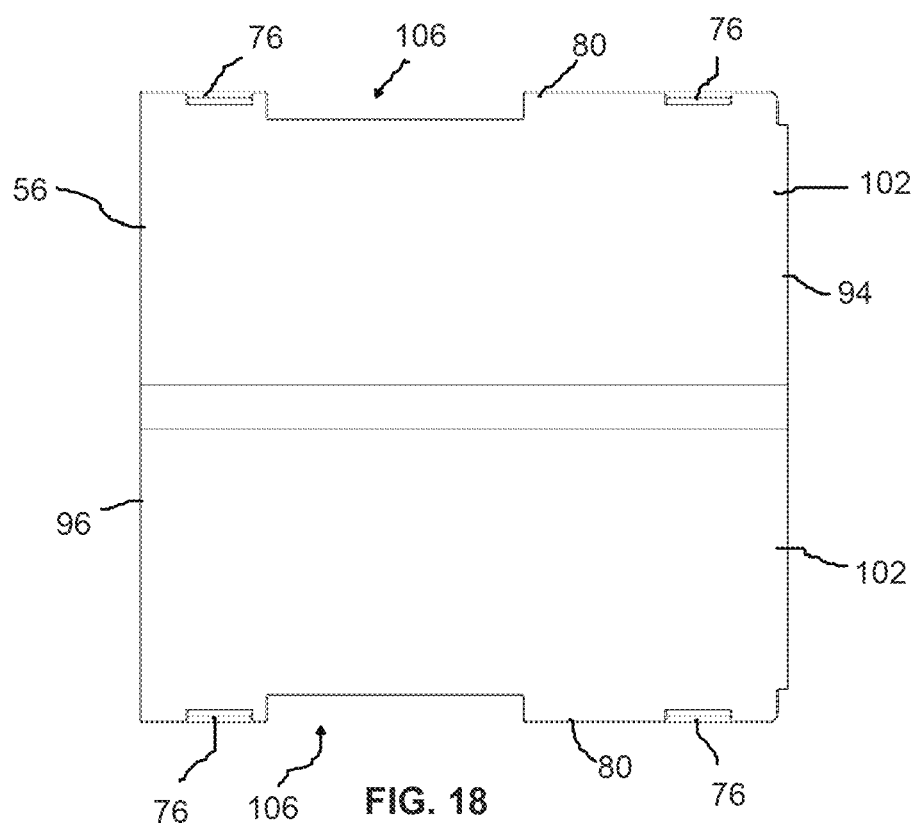
FIG. 18 is a bottom view of the auxiliary baffle of FIG. 14.

Referring now to FIGS. 10 to 13, the retention tabs 74 may preferably be configured to engage complementary retention members 76 positioned on the auxiliary baffle 56 (best seen in FIGS. 14, 17, and 18), in matching relation to the retention tabs 74. Preferably, each retention tab 74 may define an elongate channel 78 sized and shaped to receive a retention member 76 therein and snap fit with it. However, other friction fit couplings are also comprehended by the present invention, as well as other means for retaining the auxiliary baffle 56 in place, such as, for example, with gravity, a latch, including a slide latch, a swivel tab, a hook, or a fastener. All such embodiments are comprehended by the present invention.

Preferably, the complementary retention members 76 may be formed in the lateral sides 80, 80 of the auxiliary baffle 56, as shown. It is also contemplated that in other embodiments, the arrangement of the retention tabs 74 and retention members 76 may be reversed, such that the retention tabs 74 are provided on the auxiliary baffle 56, and the retention members 76 are provided on the ledges 72, in matching relation. What is important is that the tank 36 and the auxiliary baffle 56 be configured to locate and retain the auxiliary baffle 56 in place in the grease interceptor 30. All such embodiments are comprehended by the present invention.

Figure 7:
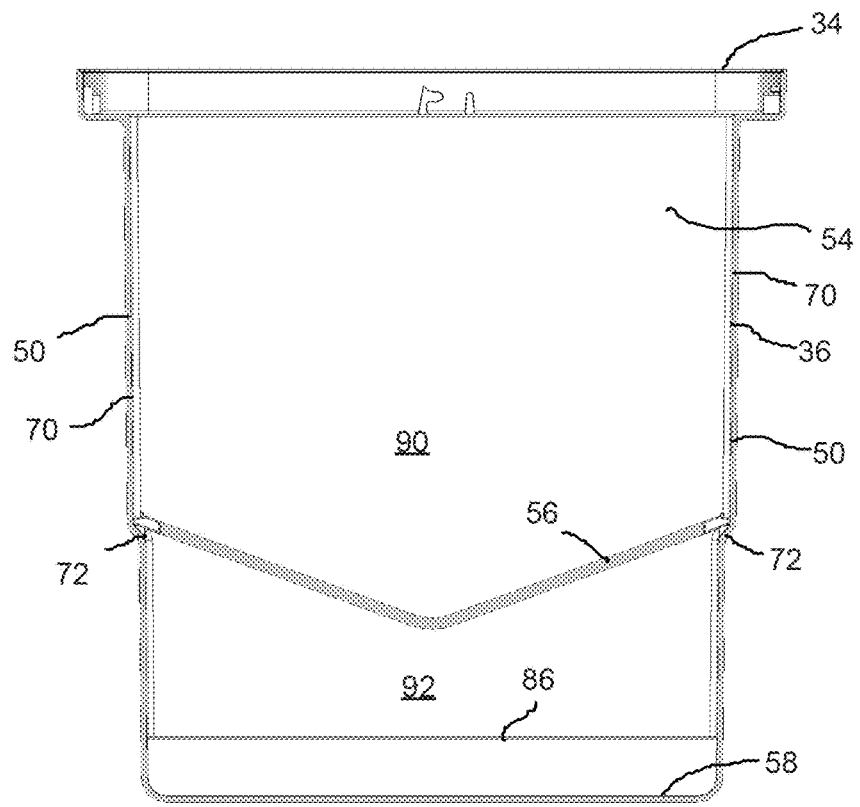
FIG. 7 is a cross-sectional view of the grease interceptor of FIG. 5 taken along line 7-7.
Figure 8:
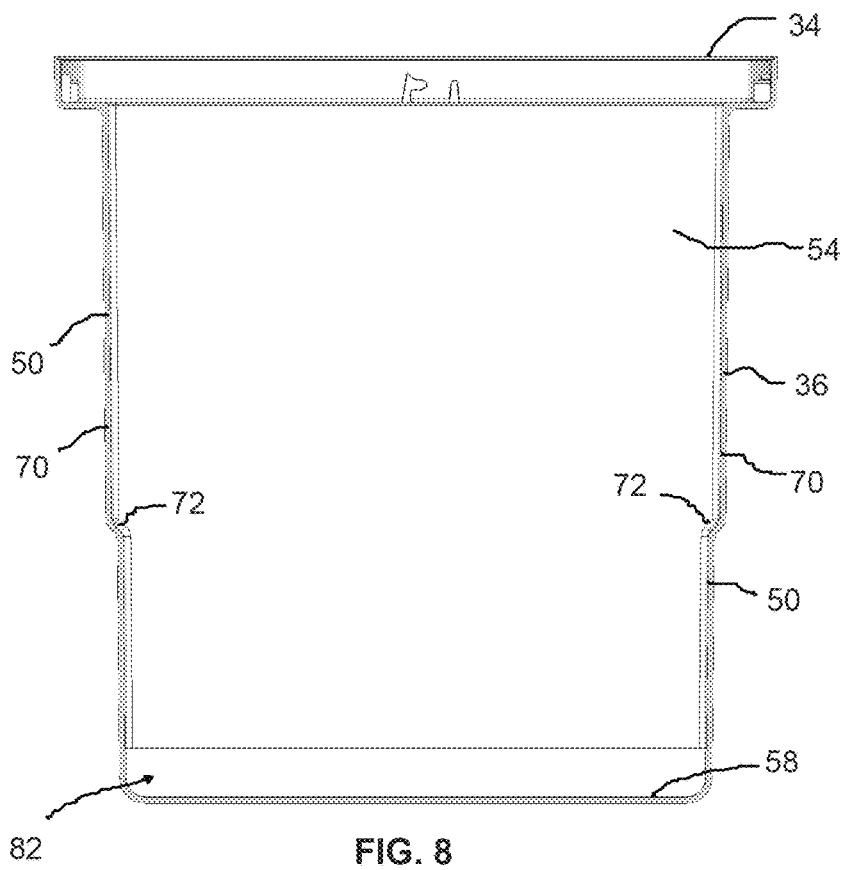
FIG. 8 is a cross-sectional view of the grease interceptor of FIG. 5 taken along line 8-8.
Figure 9:
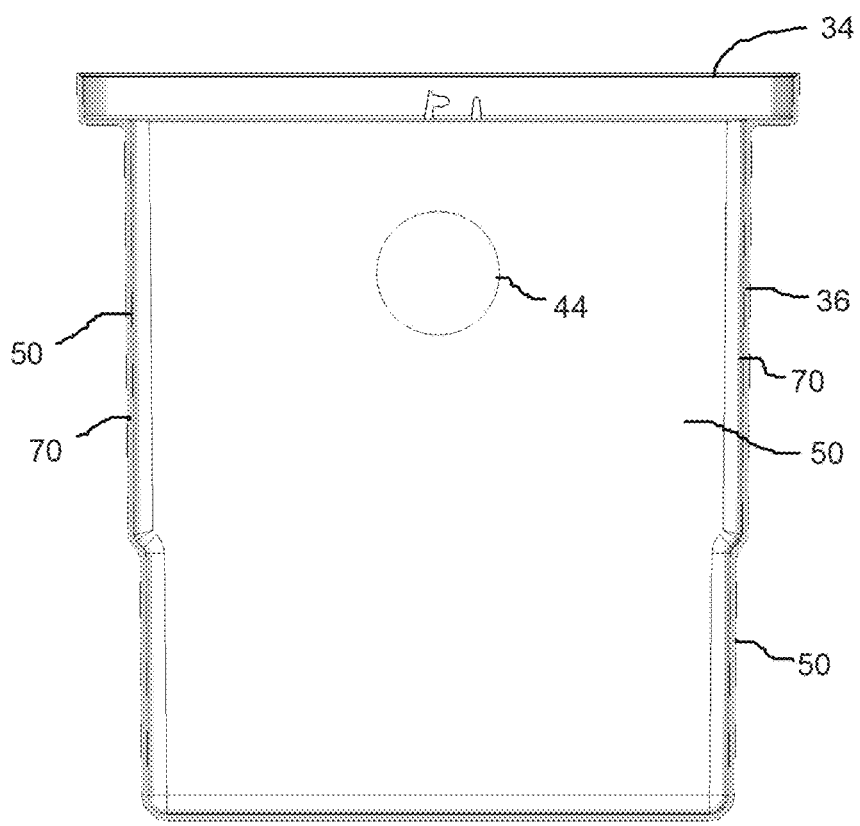
FIG. 9 is a cross-sectional view of the grease interceptor of FIG. 5 taken along line 9-9.
Figure 10:
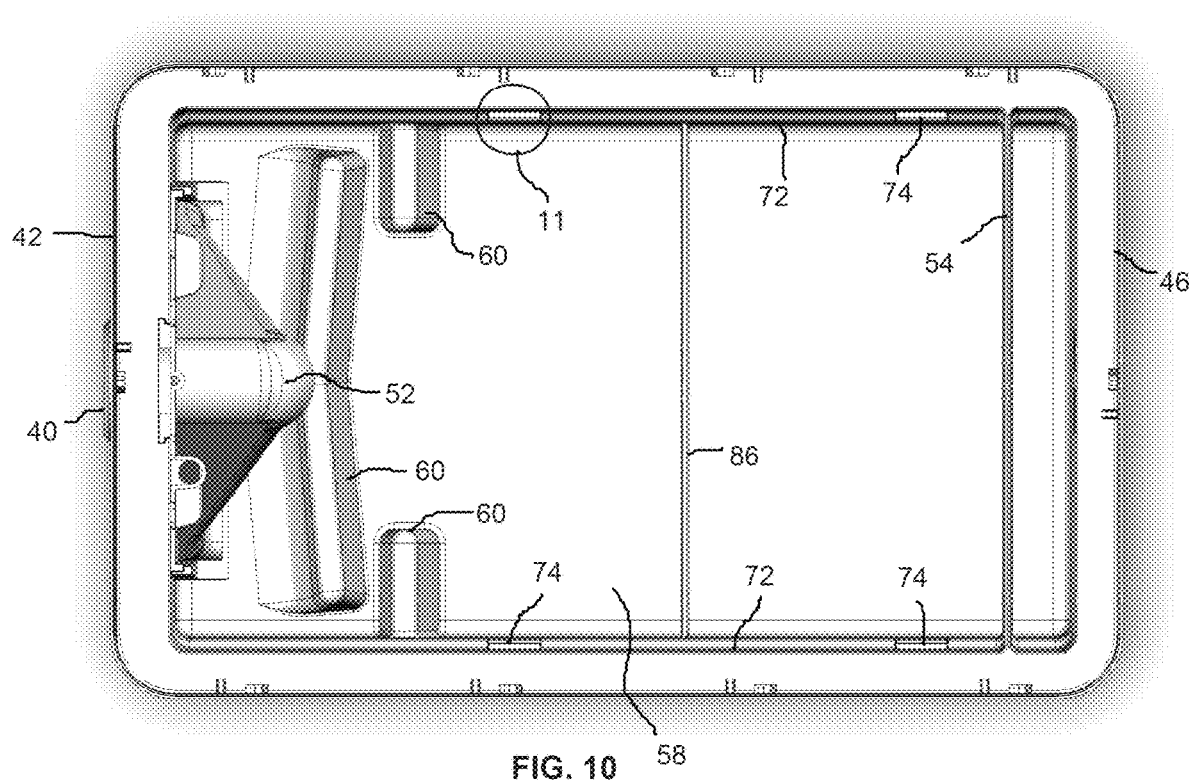
FIG. 10 is top view of FIG. 4 with the auxiliary baffle removed.
Figure 11:
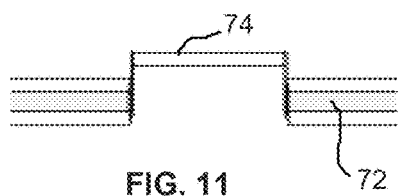
FIG. 11 is an enlarged perspective view of a detail of FIG. 10, showing a retention tab for locating and retaining the auxiliary baffle in place in the grease interceptor.
Figure 12:
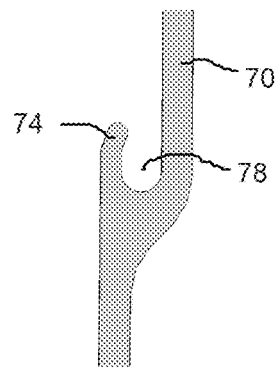
FIG. 12, is a side view of the retention tab of FIG. 11.
Figure 13:
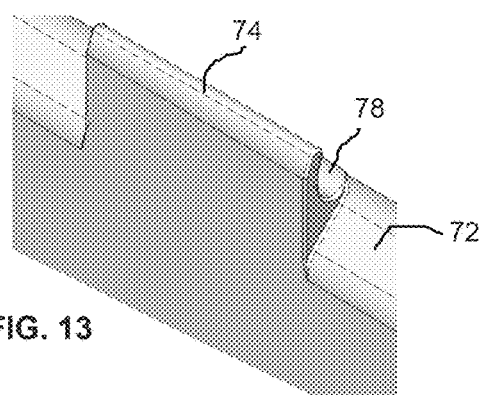
FIG. 13, is another enlarged perspective view of FIG. 10.

Referring back to FIGS. 4 and 5, the outlet baffle 54 preferably extends from the lateral side walls 70, 70 and includes an opening 82 along the floor 58 of the tank 36 to direct wastewater, which at this point is substantially free of the FOG, upwardly from the floor 58 of the chamber 48 toward the top 34 of the tank 36 so that it may flow out the outlet 44. As best seen in FIGS. 7 to 9, the outlet baffle 54 may preferably be configured as a substantially vertical wall or partition provided in the chamber 48 at the downstream end 46 of the tank 36, just upstream of the wall 50 at the downstream end 46 of the tank 36. In this example, the outlet baffle 54 spans the full width of the tank 36, extending from lateral side wall 70 to lateral side wall 70, and is spaced about 6.35 cm apart from the wall 50 at the downstream end 46. Additionally, the bottom 84 of the outlet baffle 54 may preferably be spaced apart from the floor 58 thereby defining the opening 82, which extends the full width of the tank 36, from lateral side wall 70 to lateral side wall 70. In this example, the opening 82 has a width of about 47.98 cm, and a height of about 4.13 cm.

The auxiliary baffle 56 preferably extends from one lateral side wall 70 to the opposite lateral side wall 70 of the tank 36, and from the outlet baffle 54 and/or the downstream end 46 of the chamber 48, across a major portion of the chamber 48, toward the upstream end 42. Preferably, the downstream end 94 of the auxiliary baffle 56 abuts the outlet baffle 54 and/or the downstream end 46 of the chamber 48, while the upstream end 96 of the auxiliary baffle 56 may be spaced apart from the upstream end 42 of the chamber 48 by a predetermined distance. By way of example, the predetermined distance by which the upstream end 96 of the auxiliary baffle 56 is spaced from the upstream end 42 of the chamber 48, may be sufficient to allow the mixed wastewater being redirected upwardly by the one or more ramps 60 to reach the predetermined liquid level 64 without interference, and to continue along a sinuous flow path 98 above and underneath the auxiliary baffle 56 to the outlet 44. Good results have been obtained by extending the upstream end 96 of the auxiliary baffle 56 up to the most downstream ramp 60, so that the mixed wastewater leaving the ramp 60 along the sinuous flow path 98, just clears the upstream end 96 of the auxiliary baffle 56 on its upward trajectory to the predetermined liquid level 64.

The auxiliary baffle 56 is substantially a partition, one aspect of which is to divide the chamber 48 to provide two separation sections 90, 92, located one above the other, to promote grease interceptor efficiency. In this regard, the auxiliary baffle 56 defines a first separation section 90 located generally above the auxiliary baffle 56 and a second separation section 92 located generally below the auxiliary baffle 56. Preferably, the second separation section 92 below the auxiliary baffle 56 is shielded by the auxiliary baffle 56 from the FOG separating from the mixed wastewater in the first separation section 90, as well as the FOG that is being re-emulsified from the accumulating FOG layer 68 during the ongoing inflow of the mixed wastewater into the chamber 48.

A second aspect of the auxiliary baffle 56 is to direct FOG in the second separation section 92 to the lateral side walls 70, 70 of the tank 36, as the FOG rises upwardly in the second separation section 92 due to buoyant force acting on the FOG droplets. Therefore, preferred embodiments of the auxiliary baffle 56 may have a cross-sectional shape adapted to direct the separated FOG in the second separation section 92 toward the lateral side walls 70, 70 of the tank 36 adjacent the lateral sides 80, 80 of the auxiliary baffle 56. By way of example, the auxiliary baffle 56 may have a centerline 100 extending between the downstream and upstream ends 94, 96, which is parallel with the lateral sides 80, 80, but positioned closer to the floor 58 of the chamber 48 as compared to the lateral sides 80, 80 of the auxiliary baffle 56.

With reference to FIGS. 14 to 18, the auxiliary baffle 56 may be V-shaped in cross-section, according to a preferred embodiment of the invention. In this example, the auxiliary baffle 56 has a width of about 50.94 cm, a length of about 51.52 cm, and a height of about 93.40 cm. As shown, the V-shaped cross-section of the auxiliary baffle 56 is defined by two panels 102 oriented at an angle 104 to one another. The panels 102 are substantially flat, and may have a thickness of between about 0.2 cm and about 1.5 cm, inclusive. In the example shown, the thickness of the auxiliary baffle 56 is about 0.95 cm. Preferably, the angle 104 is between about 80° and 150°, inclusive. In the example shown, the angle 104 is about 140°. However, it is contemplated that the auxiliary baffle 56 may be other cross-sectional shapes, including U-shaped, and W-shaped, for example. All such embodiments are comprehended by the present invention.

Preferably, the auxiliary baffle 56 may include one or more voids 106, such as gaps, spaces or recesses, at its lateral sides 80, 80 to form openings 108 between the auxiliary baffle 56 and the lateral side walls 70, 70 of the tank 36. Preferably, the openings 108 may be sized and shaped to allow a) wastewater to pass down through them from the first separation section 90 to the second separation section 92 below the auxiliary baffle 56, and b) FOG to pass up through them from the second separation section 92 to the first separation section 90 above the auxiliary baffle 56, as will be described in more detail below. In this example, the voids 106 are rectangular in shape, having a width of about 2.23 cm, and a length of about 20.32 cm.

Without being bound by any particular theory, it is believed that the auxiliary baffle 56 promotes the separation of FOG that flows in, or separates out, underneath the auxiliary baffle 56 by directing the separated FOG toward the lateral side walls 70, 70 of the tank 36, and upwardly through voids 106 or openings 108, to the accumulating FOG layer 68. In the portion of the sinuous flow path 98 below the auxiliary baffle 56, the mixed wastewater moves slow enough that the separated FOG can move toward the lateral side walls 70, 70 of the tank 36 following the upwardly sloped panels 102 of the auxiliary baffle 56.

In the first separation section 90, above the auxiliary baffle 56, the sinuous flow path 98 is preferably directed away from the lateral side walls 70, 70 of the tank 36 by the auxiliary baffle 56. In this example, the V-shaped cross-section of the auxiliary baffle 56 urges the portion of the sinuous flow path 98 above the auxiliary baffle 56 away from the lateral side walls 70, 70 of the tank 36, and concentrates the sinuous flow path 98 above the centerline 100 of the auxiliary baffle 56.

By directing the separated FOG in the second separation section 92 to the lateral side walls 70, 70, with the auxiliary baffle 56, the separated FOG rising upwardly from the second separation section 92, through the first separation section 90 to the accumulating FOG layer 68, will be less likely to be intercepted by the wastewater flowing along the portion of the sinuous flow path 98 in the first separation section 90, and carried with it to the second separation section 92. More preferably, the auxiliary baffle 56 may also be configured to direct the portion of the sinuous flow path 98 in the first separation section 90 away from the lateral side walls 70, 70, so that the separated FOG rising upwardly from the second separation section 92, through the first separation section 90 to the accumulating FOG layer 68, will be even less likely to be intercepted by the wastewater flowing along the sinuous flow path 98 in the first separation section 90, and carried with it to the second separation section 92.

Preferably, the auxiliary baffle 56 may be configured to direct the separated FOG in the second separation section 92 away from the sinuous flow path 98 in the first separation section 90, and even more preferably, the auxiliary baffle 56 may also shape the portion of the sinuous flow path 98 in the first separation section 90 so that it is concentrated away from the separated FOG rising through the voids 106 from the second separation section 92 in a column toward the accumulating FOG layer 68.

Preferably, the auxiliary baffle 56 may be made from a plastic, metal, or like, self-supporting material. A preferred material for the auxiliary baffle 56 is polypropylene resin. It has been found that the oleophilic nature of the polypropylene resin contributes to droplets of separated FOG coalescing on the underside 110 of the auxiliary baffle 56 and combining to make larger FOG droplets. Larger FOG droplets have a larger buoyant force to drag ratio which allows them to float faster to the accumulating FOG layer 68. Therefore, the efficiency of the separation of the FOG from the mixed wastewater in the grease interceptor 30 may be increased by facilitating the formation of larger FOG droplets, using an auxiliary baffle 56 made from polypropylene resin.

Referring now to FIGS. 19 and 20, the grease interceptor 30 is shown in operation. As can be seen, mixed wastewater flows into the chamber 48 of the tank 36 at the inlet 40, and follows a sinuous flow path 98 through the chamber 48, before exiting out the outlet 44. The wastewater entering the inlet 40 is mixed with FOG and heavy waste, including solids 88. Preferably, the wastewater exiting the chamber 48 through the outlet 44 has had at least some of the FOG and heavy waste removed from it. Most preferably, between about 80% and 100% of the FOG is removed from the mixed wastewater before exiting the chamber 48 through the outlet 44.

As indicated by the thick black arrows 98 in FIGS. 19 and 20, the sinuous flow path 98 is sized and shaped to permit the FOG to separate from the mixed wastewater and rise upwardly in the chamber 48 toward the predetermined liquid level 64 and accumulate in the FOG layer 68. The separated FOG rising in the chamber 48 is indicated by the thin black arrows 114 in FIGS. 19 and 20. In FIG. 20, the large white circles 116 represent the portions of the sinuous flow path 98 directed into the plane of the page, whereas the large black circles 118 represent the portions of the sinuous flow path 98 directed out of the plane of the page.

As shown in FIGS. 19 and 20, the sinuous flow path 98 preferably defines at least a first direction from the one or more ramps 60 toward the predetermined liquid level 64, followed by a second direction along the predetermined liquid level 64 toward the downstream end 46 of the chamber 48 in the first separation section 90, a third direction toward the upstream end 42 of the chamber 48 in the first separating section 90, and a fourth direction toward the downstream end 46 of the chamber 48 in the second separation section 92. Preferably, the length of the sinuous flow path 98 may be maximized in the first and second directions. Most preferably, the length of the sinuous flow path 98 may be maximized in the first, second and third directions, as the majority of the separation of the FOG from the mixed wastewater occurs in the first separation section 90.

Although, the majority of the separation of the FOG from the mixed wastewater occurs in the first separation section 90, additional separation of the FOG does take place in the second separation section 92. Furthermore, some separated FOG is carried from the first separation section 90 to the second separation section 92, by the mixed wastewater flowing along the sinuous flow path 98. However, the majority of the separated FOG in the first separation section 90 is blocked from entering the second separation section 92 by the auxiliary baffle 56. As shown in FIGS. 19 and 20 with the thin arrows 114, the separated FOG rises upwardly in the second separation section 92 until it reaches the auxiliary baffle 56. Then the FOG is directed by the auxiliary baffle 56 toward the lateral side walls 70, 70 of the tank 36, along the underside 110 of the auxiliary baffle 56. As mentioned above, the auxiliary baffle 56 may preferably be made from polypropylene resin, as the oleophilic nature of the polypropylene resin has been found to help droplets of the separated FOG to coalesce on the underside 110 of the auxiliary baffle 56 and combining to make larger FOG droplets, which can float faster to the accumulating FOG layer 68. In FIG. 19, the small dots 120 represent the separated FOG being directed out of the plane of the page, upwardly along the upwardly sloped underside 110 of the auxiliary baffle 56, toward the lateral wall 70 of the tank 36.

Referring now to FIG. 20, when the separated FOG being directed toward the lateral walls 70, 70 of the tank 36 reaches the openings 108, it proceeds to rise upwardly through openings 108, and continues to rise upwardly along the lateral walls 70,70 to the accumulating FOG layer 68. It will be appreciated that by directing the rising separated FOG from the second separation section 92 to the accumulating FOG layer 68 along the lateral walls 70, 70 of the tank 36, away from the sinuous flow path 98 in this way, there is less opportunity for the mixed wastewater flowing along the sinuous flow path 98 to capture the separated FOG and bring it back into the second separation section 92, or otherwise urge the separated FOG back towards the second separation section 92.

In summary, FIGS. 1 to 20 show an embodiment of an in-line grease interceptor 30 adapted to separate FOG out from wastewater mixed with the FOG. The grease interceptor 30 shown in the figures has an inlet 40 for receiving the mixed wastewater, an outlet 44 for discharging the wastewater after at least some FOG has been separated out from the mixed wastewater, and a chamber 48 hydraulically located between the inlet 40 and the outlet 44. The chamber 48 has walls 50, a floor 58, and an open top 34, and is adapted to maintain the mixed wastewater in the chamber 48 at a predetermined liquid level 64, which is below the top 34 of the tank 36, while accumulating the separated FOG in a layer 68 above the predetermined liquid level 64. An auxiliary baffle 56 is positioned inside the chamber 48, to extend from a downstream end 46 of the chamber 48 toward an upstream end 42 of the chamber 48, between the floor 58 and the open top 34. Preferably, the auxiliary baffle 56 may be oriented to be substantially parallel to the FOG layer 68 between the upstream end 42 and the downstream end 46, and positioned between the floor 58 and the predetermined liquid level 64. The auxiliary baffle 56 has a downstream end 94, an upstream end 96, and lateral sides 80, 80. The auxiliary baffle 56 defines a first separation section 90 above the auxiliary baffle 56, and a second separation section 92 below the auxiliary baffle 56. Three sets of water directors, such as the inlet baffle 52, the ramps 60, and the outlet baffle 54, are preferably positioned in the chamber 48 to provide a sinuous flow path 98 for the mixed wastewater through the chamber 48 from the inlet 40 to the outlet 44 via the first separation section 90, and the second separation section 92. The auxiliary baffle 56 is sized, shaped and positioned in the chamber 48 to substantially block the separated FOG in the first separation section 90 from entering the second separation section 92.

A solids dam 86 may preferably be provided on the floor 58 of the chamber 48 to help prevent heavy waste and other solids 88 from accumulating at the opening 82 of the outlet baffle 54, and potentially clogging the opening 82 and the outlet baffle 54. As best seen in FIGS. 5 and 7, according to one embodiment of the present invention, the solids dam 86 may be formed as a short, upstanding wall extending from lateral side 70 to lateral side 70 of the tank 36. The solids dam 86 may preferably be, positioned underneath the auxiliary baffle 56, substantially midway between the ramps and the opening 82 of the outlet baffle 54. Although, the solids dam 86 may be omitted in some embodiments, when present, the solids dam 86 will preferably be sized, shaped, and positioned to optimize the retention of solids 88 in the chamber 48, away from the opening 82, without reducing a) the efficiency of the separation of FOG from the mixed wastewater in the second separation section 92 underneath the auxiliary baffle 56, and b) the movement of the separated FOG upwardly in the first separation section 90, and through the auxiliary baffle 56 to the second separation section 92 above the auxiliary baffle 56.

In this regard, it has been found that by positioning the solids dam 86 further away from the opening 82, the FOG has more time to separate from the mixed wastewater in the second separation section 92 and rise upwardly to avoid being sucked up through the opening 82 of the outlet baffle 54. Moreover, the further away the solids dam 86 is positioned from the opening 82, the more likely it will be that the sinuous flow path 98 will be shaped so that the opening 82 of the outlet baffle 54 will drain the wastewater at the level of the floor 58, which is substantially free of the FOG at this point. However, when the solids dam 86 is positioned further away the opening 82 less of the solids 88 dropping down from the mixed wastewater along the sinuous flow path 98 can be captured and retained by the solids dam 86. What is important, therefore, is to position the solids dam 86 as close to the opening 82 as possible, to capture and retain as much of the solids 88, without increasing the amount of FOG being drained out the opening 82 from the second separation section 92 past a level that is considered to be unacceptable. It will be appreciated that in addition to the position of the solids dam 86, the height of the solids dam 86 also plays a factor in the relationship between sucking up FOG from the second separation section 92 through the opening 82 in the outlet baffle 54 and capturing and retaining solids 88. In this example, the solids dam 86 has a height of about 5.08 cm, and is positioned 36.77 cm upstream of the opening 82 in the outlet baffle 54.

Figure 21:
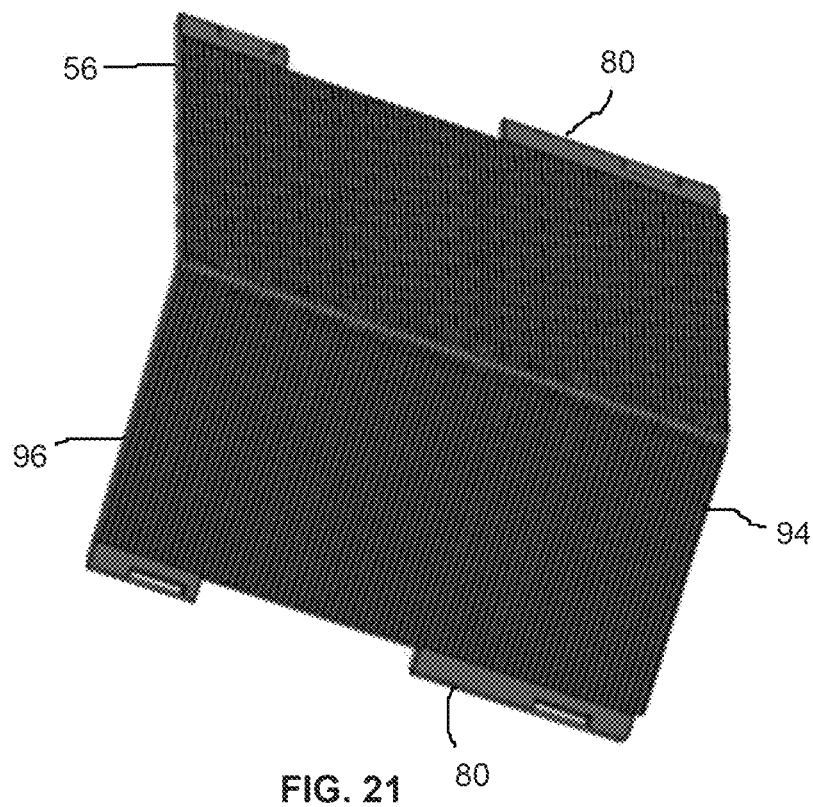
FIG. 21 is a perspective view of an auxiliary baffle having grooves on the underside of the auxiliary baffle, according to another embodiment of the present invention.
Figure 22:
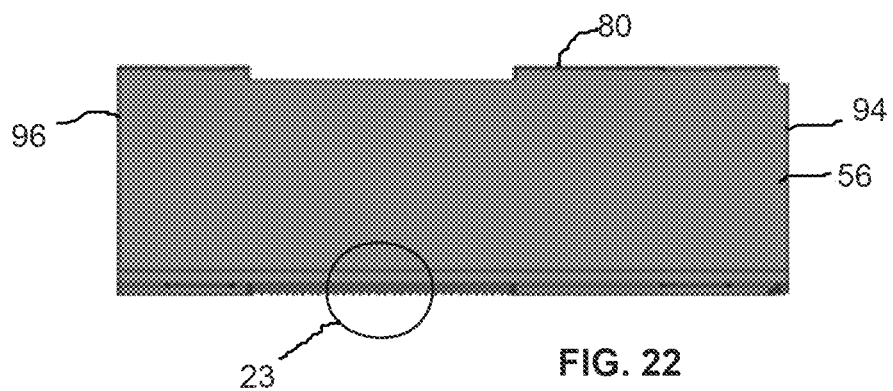
FIG. 22 is a side view of the auxiliary baffle of FIG. 21.
Figure 23:
FIG. 23 is an enlarged view of a detail of FIG. 22, showing the grooves.

Referring now to FIGS. 21 to 23 there is shown an auxiliary baffle 56 according to another embodiment of the present invention. In this embodiment, the auxiliary baffle 56 has a plurality of grooves 112 on the underside 110 of the auxiliary baffle 56. Preferably, the grooves 112 may have a depth of about 0.1 cm to about 1.0 cm, inclusive, and extend outwardly from the centerline 100 of the auxiliary baffle 56 to its lateral sides 80, 80.

Without being bound by any particular theory, it is believed that the grooves 112 promote the formation of larger FOG droplets by guiding the separated FOG coalescing on the underside 110 of the auxiliary baffle 56 together to make larger FOG droplets, and/or by increasing the surface area of the underside 110 of the auxiliary baffle 56 thereby increasing the oleophilic effect of the polypropylene resin. As mentioned above, larger FOG droplets have a larger buoyant force to drag ratio which allows them to float faster to the accumulating FOG layer 68. Therefore, the efficiency of the separation of the FOG from the mixed wastewater in the grease interceptor 30 may be increased by facilitating the formation of larger FOG droplets, by providing the grooves 112 on the underside of the auxiliary baffle 56.

With reference now to FIGS. 24 to 31, there are shown several auxiliary baffles 56 according to other embodiments of the present invention.

Figure 24:
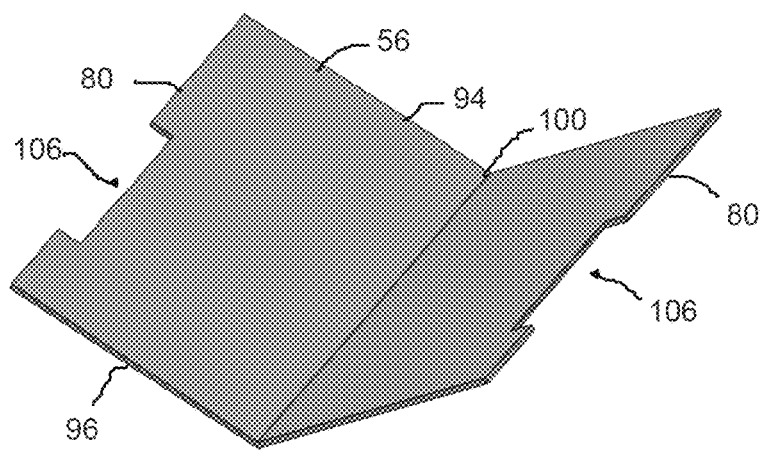
FIG. 24 is a perspective view of an auxiliary baffle, according to yet another embodiment of the present invention, similar to FIG. 14.

For example, FIG. 24 shows an auxiliary baffle 56 which is similar to the above described auxiliary baffle 56 (see FIG. 14), except that the retention members 76 have been omitted. In this example, the lateral sides 80, 80 of the auxiliary baffle shown are supported on ledges 72, and may be retained in position by any means known in the art.

Figure 25:
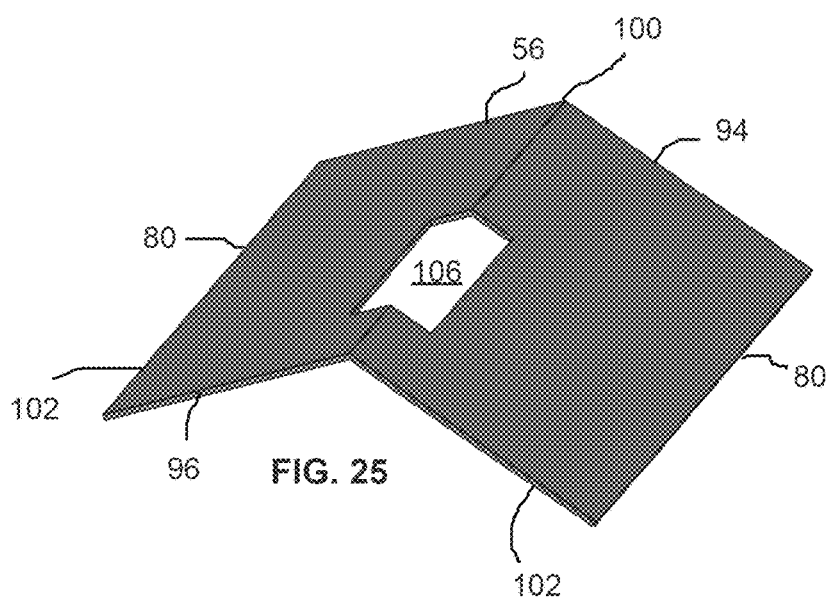
FIG. 25 is a perspective view of an auxiliary baffle, according to yet another embodiment of the present invention.

FIG. 25 shows an auxiliary baffle 56, having an inverted V-shaped cross-section, and defining a void 106 at its centerline 100. In this example, the lowest portion of the auxiliary baffle 56 is not the centerline 100, but the lateral sides 80, 80. Instead, the centerline 100 is the highest portion of the auxiliary baffle 56. Accordingly, this auxiliary baffle 56 shown in FIG. 25 promotes the separation of FOG that flows in, or separates out, in the second separation section 92 underneath the auxiliary baffle 56 by directing the separated FOG away from the lateral side walls 70, 70, preferably toward a location between the lateral side walls 70, 70 of the tank 36. Most preferably, the auxiliary baffle 56 may direct the separated FOG toward a location substantially equidistant between the lateral side walls 70,70. A void 106 positioned at the centerline 100 of the auxiliary baffle 56 is sized and shaped to allow a) wastewater to pass down through it from the first separation section 90 to the second separation section 92 below the auxiliary baffle 56, and b) FOG to pass up through the void 106 from the second separation section 92 to the first separation section 90 above the auxiliary baffle 56. In this example, the void 106 is rectangular in shape, having a width of about 6 cm, and a length of about 20 cm.

Additionally, the auxiliary baffle 56 shown in FIG. 25 also urges the portion of the sinuous flow path 98 in the first separation section 90 away from the centerline 100 of the auxiliary baffle 56, toward the lateral side walls 70, 70, so that the separated FOG rising upwardly from the second separation section 92, through the void 106, and continuing upwardly through the first separation section 90 to the accumulating FOG layer 68, will be even less likely to be intercepted by the wastewater flowing along the sinuous flow path 98 in the first separation section 90, and carried with it to the second separation section 92.

In this example, the inverted V-shaped cross-section of the auxiliary baffle 56 urges the portion of the sinuous flow path 98 above the auxiliary baffle 56 away from the centerline 100, toward the lateral side walls 70, 70 of the tank 36, thereby splitting the sinuous flow path 98 into two substantially parallel sinuous flow paths 98 spaced apart from each other along the centerline 100 of the auxiliary baffle 56.

Thus by simultaneously shaping the portion of the sinuous flow path 98 in the first separation section 90 so that it is concentrated away from the centerline 100, and directing the separated FOG in the second separation section 92 toward the void 106, the auxiliary baffle 56 shown in FIG. 25 is able to direct the rising separated FOG from the second separation section 92, through the void 106 and upwardly through the first separation section 90 to the accumulating FOG layer 68, substantially without being intercepted by the wastewater flowing along the sinuous flow path 98 in the first separation section 90, and carried with it to the second separation section 92.

Figure 26:
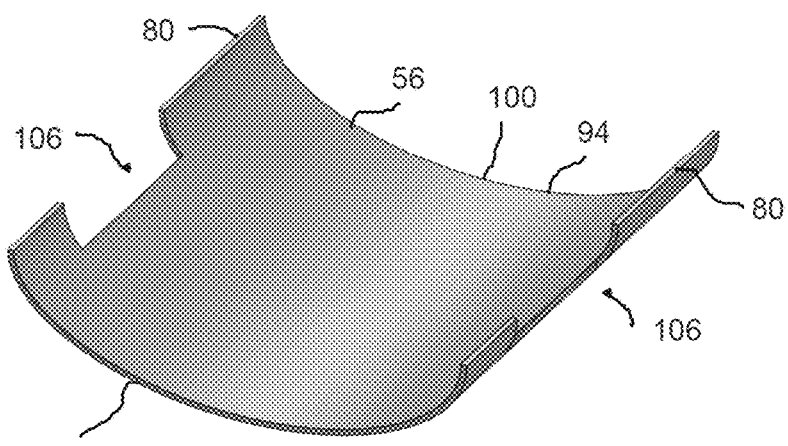
FIG. 26 is a perspective view of an auxiliary baffle, according to yet another embodiment of the present invention.

FIG. 26 shows an auxiliary baffle 56 which is similar to the auxiliary baffle 56 shown in FIG. 24, except that it is U-shaped, instead of V-shaped, in cross-section. In this example, the auxiliary baffle 56 has a curved shape, with the lowest point relative to the floor 58 of the chamber 48 being defined by its centerline 100.

Figure 27:
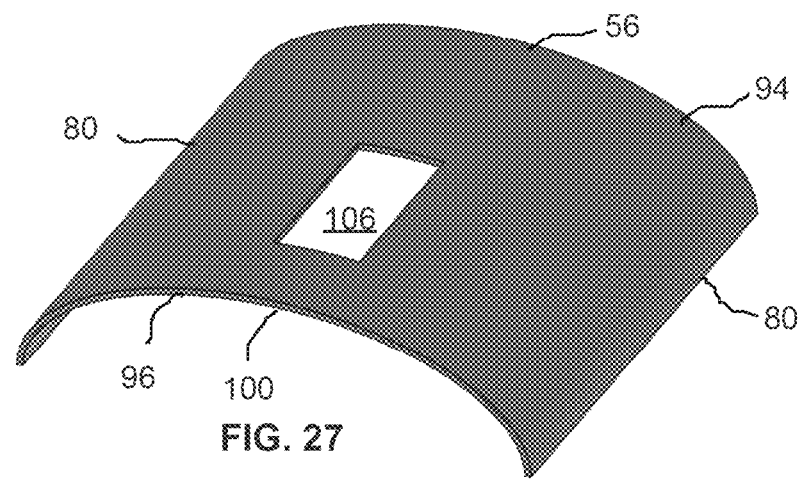
FIG. 27 is a perspective view of an auxiliary baffle, according to yet another embodiment of the present invention.

FIG. 27 shows an auxiliary baffle 56 which is similar to the auxiliary baffle 56 shown in FIG. 25, except that it is inverted U-shaped, instead of inverted V-shaped, in cross-section. In this example, the auxiliary baffle 56 has a curved shape, with the highest point relative to the floor 58 of the chamber 48 being defined by its centerline 100.

Figure 28:
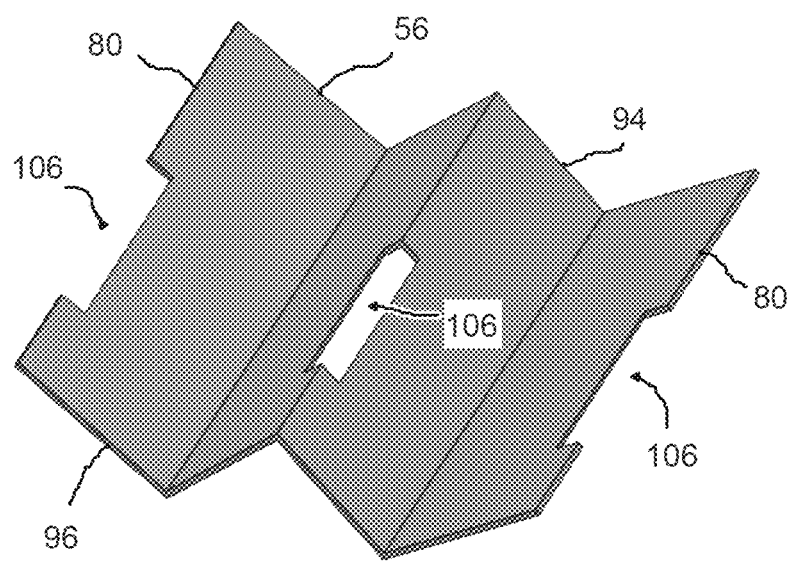
FIG. 28 is a perspective view of an auxiliary baffle, according to yet another embodiment of the present invention.

FIG. 28 shows an auxiliary baffle 56 which is W-shaped in cross-section. In this example, the auxiliary baffle 56 combines the features of the V-shaped auxiliary baffle 56 shown in FIG. 24, and the inverted V-shaped auxiliary baffle 56 shown in FIG. 25.

Figure 29:
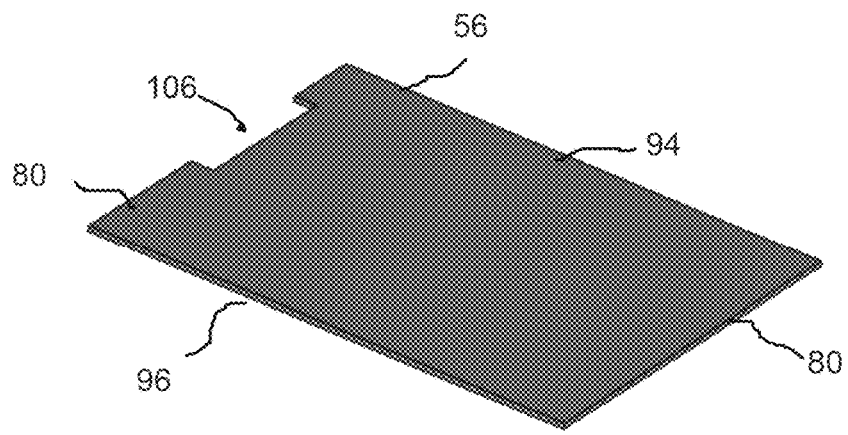
FIG. 29 is a perspective view of an auxiliary baffle, according to yet another embodiment of the present invention.
Figure 30:
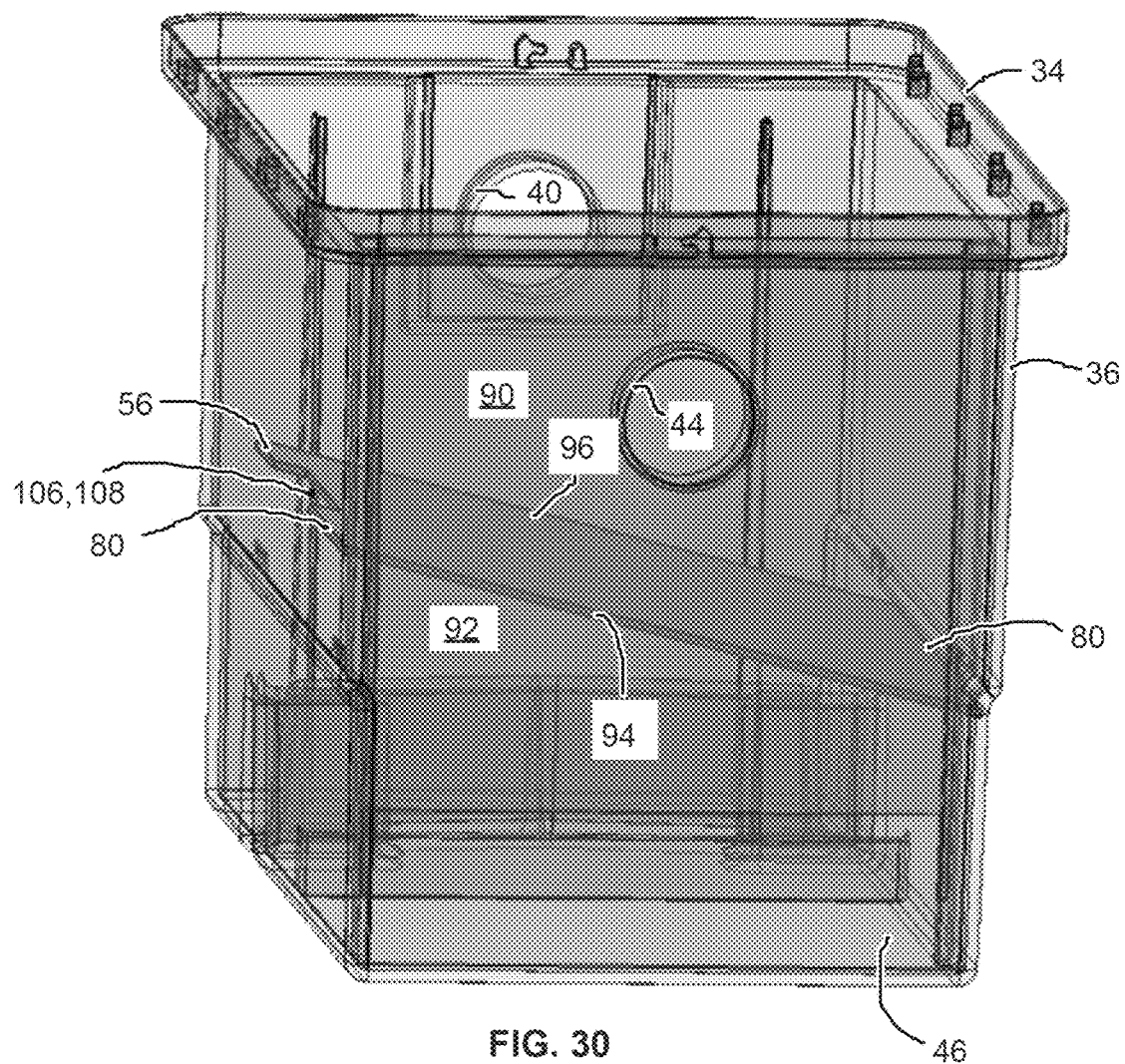
FIG. 30 is a perspective view of a grease interceptor with the lid, inlet baffle, and outlet baffle removed, and the walls of the tank transparent, to show the interior of the tank, including the auxiliary baffle of FIG. 29, according to another embodiment of the present invention.

FIG. 29 shows an auxiliary baffle 56 which has a flat cross-section, and defines a void 106 in one of its lateral sides 80. The void 106 may be sized and shaped to form an opening 108 between the auxiliary baffle 56 and the lateral side wall 70 of the tank 36, when the lateral side 80 is positioned in the chamber 48 to abut the lateral side wall 70. As shown in FIG. 30, the auxiliary baffle 56 according to this embodiment of the invention may be positioned in the chamber 48 at an angle such that the lateral side 80 with the void 106 abuts the lateral side wall 70 higher above the floor 58, than the other lateral side 70. In this way, the auxiliary baffle 56 may direct separated FOG rising in the second separation section 92 along its upwardly sloped underside 110 toward the one lateral side wall 70, where it may float upwardly through the void 106, to the first separation section 90, and along the lateral wall 70 to the accumulating FOG layer 68. In this example, the auxiliary baffle 56 is configured to direct the separated FOG rising in the second separation section 92 to only one of the lateral side walls 70 of the tank 36, and not the other, and the opening 108 formed by the void 106 is positioned to direct FOG to rise along the same lateral side wall 70 on its journey through the first separation section 90 to the accumulating FOG layer 68.

Figure 31:
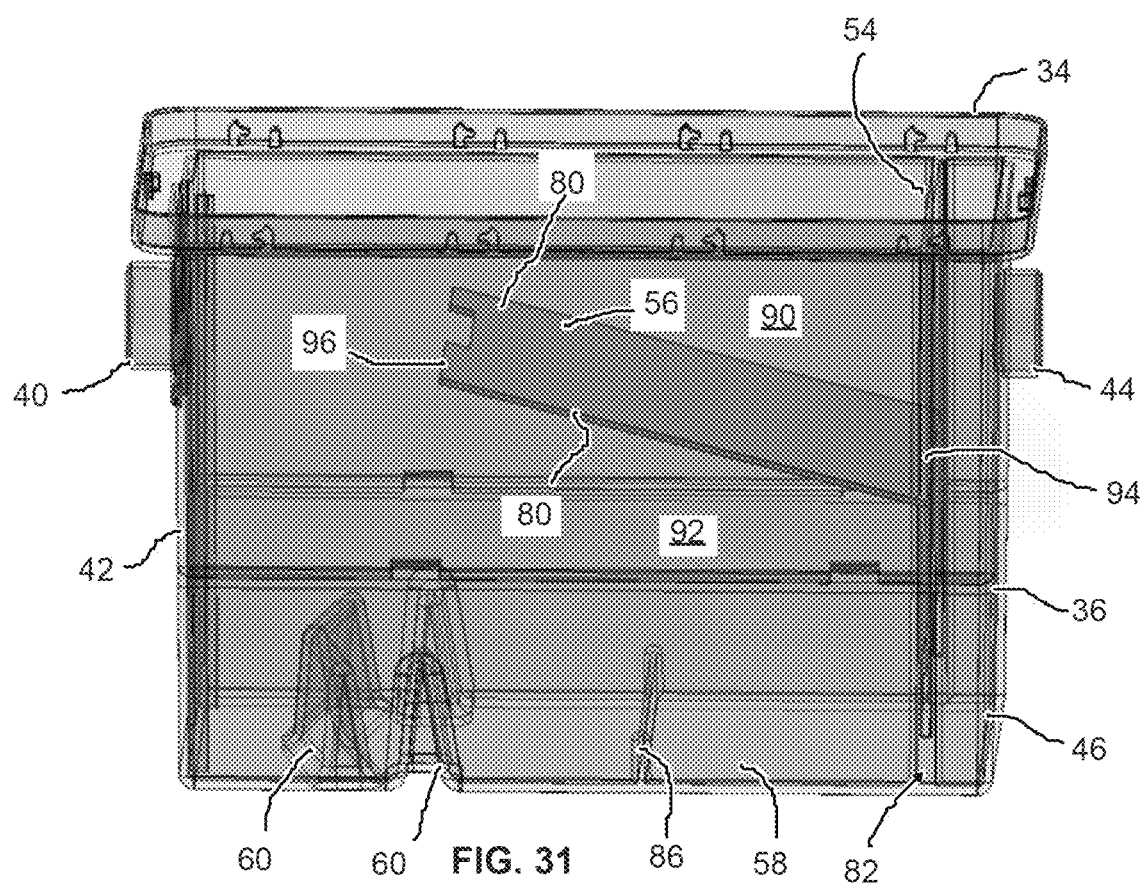
FIG. 31 is a perspective view of a grease interceptor with the lid, inlet baffle, and outlet baffle removed, and the walls of the tank transparent, to show the interior of the tank, including the auxiliary baffle of FIG. 29, according to another embodiment of the present invention.

FIG. 30 shows an auxiliary baffle 56 which has a flat cross-section, and defines a void 106 its upstream end 96. Preferably, the void 106 may be sized and shaped to allow the separated FOG in the second separation section 92 underneath the auxiliary baffle 56 to pass through to the first separation section 90 above the auxiliary baffle 56 and continue upwardly toward the accumulating FOG layer 68. As shown in FIG. 31, the auxiliary baffle 56 according to this embodiment of the invention may be positioned in the chamber 48 at an angle such that the downstream end 94 abuts the outlet baffle 54, and slopes upwardly toward the FOG layer 68, from the downstream end 46 of the chamber 48 toward the upstream end 42 of the chamber 48. In other words, the downstream end 94 of the auxiliary baffle 56 is lower relative to the floor 58, than the upstream end 96 of the auxiliary baffle 56. In this way, the auxiliary baffle 56 may direct separated FOG rising in the second separation section 92 along its upwardly sloped underside 110 toward the upstream end 42 of the chamber 48, where it may float upwardly through the void 106, to the first separation section 90, to the accumulating FOG layer 68. However, it is also contemplated that in this configuration of the auxiliary baffle 56 shown in FIG. 31, the void 106 may be omitted, because the FOG is free to rise upwardly from underneath the auxiliary baffle 56 at the upstream end 96 of the auxiliary baffle 56, and continue to rise upwardly toward the accumulating FOG layer 68, without the presence of a void 106.

All of the above examples of auxiliary baffles 56 are comprehended by the present invention.

Having described various preferred embodiments of the grease interceptor 30, and the auxiliary baffle 56 incorporating the same, it can now be understood that they enable a method of preventing fat, oil, and grease (FOG) being carried out with wastewater mixed with the FOG from, for example, a food preparation establishment to a sewer system. The method preferably involves receiving the mixed wastewater in a chamber 48 through an inlet 40 at an upstream end 42 of a chamber 48. Preferably, the chamber 48 is adapted to maintain the mixed wastewater at a predetermined liquid level 64 located below its open top 34 while accumulating the separated FOG in a layer above the predetermined liquid level 64. An auxiliary baffle 56 may be positioned inside the chamber 48, extending from the downstream end 46 of the chamber 48 toward the upstream end 42 of the chamber 48, between the floor 58 and the open top 34 to define a first separation section 90 above the auxiliary baffle 56, and a second separation section 92 below the auxiliary baffle. Mixed wastewater may be directed through the chamber 48 along a sinuous flow path 98 from the inlet 40 to an outlet 44, via the first separation section 90 and the second separation section 92. At least some of the FOG may be allowed to separate from the mixed wastewater in the first separation section 90 to accumulate in the FOG layer 68 above the predetermined liquid level 64. The separated FOG in the first separation section 90 may be blocked from entering the second separation section 92 with the auxiliary baffle 56. Mixed wastewater in the second separation section 92 may be directed toward the outlet 44 at the downstream end 46 of the chamber 48, and discharged through the outlet 44, after at least some of the FOG has been separated out from the mixed wastewater.

Preferably, the method may also involve the steps of allowing at least some FOG remaining in the mixed wastewater in the second separation section 92 to separate out from the mixed wastewater in the second separation section 92, and then allowing the separated FOG to pass through a portion of the auxiliary baffle 56, from the second separation section 92 to the first separation section 90. Preferably, the method may also involve the step of directing a portion of the sinuous flow path 98 in the first separation section 90 away from the separated FOG passing through the at least one portion of the auxiliary baffle 56 and rising upwardly to the accumulating FOG layer 68.

Preferably, the method may also involve the step of concentrating a portion of the sinuous flow path 98 in the first separation section 90 away from the separated FOG passing through the portion of the auxiliary baffle 56 from the second separation section 92 in a column toward the accumulating FOG layer 68, with the auxiliary baffle 56.

Preferably, the method may also involve the steps of removing the auxiliary baffle 56 from the chamber 48, cleaning the chamber 48 and the auxiliary baffle 56, and installing the auxiliary baffle 56 back in the chamber 48.

While reference has been made to various preferred embodiments of the invention other variations, implementations, modifications, alterations and embodiments are comprehended by the broad scope of the appended claims.

Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

What is claimed:

1. An in-line grease interceptor assembly adapted to separate fat, oil, and grease (FOG) out from wastewater mixed with said FOG, said assembly comprising:
    an inlet for receiving said wastewater mixed with said FOG;
    an outlet for discharging said wastewater after at least some FOG has been separated out from said mixed wastewater;
    a chamber hydraulically located between said inlet and said outlet, said chamber having lateral sides, a floor, and an open top, and being adapted to maintain said mixed wastewater in said chamber at a predetermined liquid level located below said open top while accumulating said separated FOG in a layer above said predetermined liquid level;
    an auxiliary baffle positioned inside said chamber, extending from a downstream end of said chamber toward an upstream end of said chamber, between said floor and said open top, said auxiliary baffle having a downstream end, an upstream end, an underside, and lateral sides, and defining a first separation section above said auxiliary baffle, and a second separation section below said auxiliary baffle; and
    one or more water directors positioned in said chamber to provide a sinuous flow path for said mixed wastewater through said chamber from said inlet to said outlet via said first separation section, and said second separation section;
    wherein said auxiliary baffle is sized, shaped and positioned in said chamber to substantially block said separated FOG in said first separation section from entering said second separation section.

2. The in-line grease interceptor assembly of claim 1, wherein said auxiliary baffle is substantially parallel to said predetermined liquid level, between said upstream and downstream ends of said chamber.

3. The in-line grease interceptor assembly of claim 1, wherein said auxiliary baffle slopes upwardly, from said downstream end of said chamber to said upstream end of said chamber.

4. The in-line grease interceptor assembly of claim 1, wherein said auxiliary baffle is positioned between said floor and said predetermined liquid level.

5. The in-line grease interceptor assembly of claim 1, wherein at least some FOG remaining in said mixed wastewater in said second separation section is allowed to separate out from said mixed wastewater in said second separation section; and
    wherein said auxiliary baffle is adapted to allow said separated FOG in said second section to pass through at least one portion of said auxiliary baffle, from said second separation section to said first separation section.

6. The in-line grease interceptor assembly of claim 5, wherein said auxiliary baffle comprises a void in at least one of said lateral sides, said void being sized and shaped to form an opening between said auxiliary baffle and said lateral side of said chamber adjacent to said void, said opening being adapted to allow said separated FOG in said second separation section to pass through said auxiliary baffle to said first separation section.

7. The in-line grease interceptor assembly of claim 5, wherein said auxiliary baffle comprises at least one opening adapted to allow said separated FOG in said second separation section to pass through said auxiliary baffle to said first separation section.

8. The in-line grease interceptor assembly of claim 5, wherein said at least one portion of said auxiliary baffle is positioned to direct said separated FOG away from a portion of said sinuous flow path in said first separation section.

9. The in-line grease interceptor assembly of claim 8, wherein said at least one portion of said auxiliary baffle is positioned to direct said separated FOG toward at least one of said lateral sides of said chamber.

10. The in-line grease interceptor assembly of claim 8, wherein said at least one portion of said auxiliary baffle is positioned to direct said separated FOG toward a location away from said lateral sides of said chamber.

11. The in-line grease interceptor assembly of claim 10, wherein said location is substantially equidistant between said lateral sides of said chamber.

12. The in-line grease interceptor assembly of claim 5, wherein said auxiliary baffle is adapted to direct a portion of said sinuous flow path in said first separation section away from said separated FOG passing through said at least one portion of said auxiliary baffle and rising upwardly to said accumulating FOG layer.

13. The in-line grease interceptor assembly of claim 1, wherein said auxiliary baffle extends a major portion of a length of said chamber, between said downstream end of said chamber and said upstream end of said chamber.

14. The in-line grease interceptor assembly of claim 13, wherein said downstream end of said auxiliary baffle abuts said downstream end of said chamber.

15. The in-line grease interceptor assembly of claim 13, wherein said upstream end of said auxiliary baffle is spaced from said upstream end of said chamber.

16. The in-line grease interceptor assembly of claim 1, wherein said predetermined liquid level is at a static water level of said chamber.

17. The in-line grease interceptor assembly of claim 1, wherein said auxiliary baffle is located substantially midway between a static water level of said chamber and said floor.

18. The in-line grease interceptor assembly of claim 1, further comprising baffle supports inside said chamber adapted to support said lateral sides of said auxiliary baffle, and releasably hold said auxiliary baffle in said position.

19. The in-line grease interceptor assembly of claim 18, wherein said auxiliary baffle supports comprise one or more of projections and recesses located in opposed sides of said chamber, said one or more projections and recesses being sized and shaped to releasably engage said lateral sides of said auxiliary baffle.

20. The in-line grease interceptor assembly of claim 1, further comprising a lid for covering said open top.

21. The in-line grease interceptor assembly of claim 1, wherein said auxiliary baffle comprises a flat sheet of self-supporting material, or a shaped sheet of self-supporting material.

22. The in-line grease interceptor assembly of claim 21, wherein said self-supporting material is metal or plastic.

23. The in-line grease interceptor assembly of claim 22, wherein said auxiliary baffle is made from plastic comprising polypropylene resin.

24. The in-line grease interceptor assembly of claim 1, wherein at least said underside of said auxiliary baffle is oleophilic.

25. The in-line grease interceptor assembly of claim 1, wherein said auxiliary baffle comprises a plurality of grooves on said underside adapted to direct said FOG coalescing on said underside of said auxiliary baffle toward at least one of said lateral sides of said auxiliary baffle.

26. The in-line grease interceptor assembly of claim 1, wherein said auxiliary baffle has a centerline extending between said upstream end and said downstream end, and being parallel to said lateral sides; and wherein said centerline is positioned closer to said floor as compared to said lateral sides of said auxiliary baffle.

27. The in-line grease interceptor assembly of claim 1, wherein said auxiliary baffle has a centerline extending between said upstream end and said downstream end, and being parallel to said lateral sides; and wherein said centerline is positioned further from said floor as compared to said lateral sides of said auxiliary baffle.

28. The in-line grease interceptor assembly of claim 27, further comprising an opening in said auxiliary baffle adjacent one of said lateral sides of said chamber, said opening being sized and shaped to allow said separated FOG in said second separation section to pass through said auxiliary baffle to said first separation section.

29. The in-line grease interceptor assembly of claim 1, wherein said auxiliary baffle is flat, U-shaped, W-shaped, inverted V-shaped, inverted U-shaped, or inverted W-shaped, in cross-section.

30. The in-line grease interceptor assembly of claim 29, wherein said V-shaped cross-section of said auxiliary baffle is defined by at least two panels oriented at an angle to one another.

31. The in-line grease interceptor assembly of claim 30, wherein said angle is between 120° and 150°, inclusive.

32. The in-line grease interceptor assembly of claim 1, wherein said one or more water directors comprises an inlet baffle for directing said mixed wastewater from said inlet toward said floor.

33. The in-line grease interceptor assembly of claim 32, wherein said one or more water directors further comprises a ramp extending from said floor for receiving and redirecting said mixed wastewater from said inlet baffle toward said predetermined liquid level and said first separation section.

34. The in-line grease interceptor assembly of claim 33, wherein said sinuous flow path is sized and shaped to permit said FOG to rise out of said mixed wastewater in said first separation section and accumulate in said FOG layer.

35. The in-line grease interceptor assembly of claim 34, wherein said sinuous flow path defines at least a first direction from said ramp toward said predetermined liquid level, a second direction along said predetermined liquid level toward said downstream end of said chamber in said first separation section, a third direction toward an upstream end of said chamber in said first separating section, and a fourth direction toward said downstream end of said chamber in said second separation section.

36. The in-line grease interceptor assembly of claim 35, wherein a length of said sinuous flow path is maximized in said first and second directions.

37. The in-line grease interceptor assembly of claim 1, wherein said one or more water directors comprises an outlet baffle for directing said wastewater substantially free of FOG from said second separation section to said outlet.

38. The in-line grease interceptor assembly of claim 37, wherein said outlet baffle defines an opening adjacent said floor at said downstream end of said chamber.

39. The in-line grease interceptor assembly of claim 38, further comprising a solids dam for retaining solids in said chamber away from said outlet baffle opening.

40. The in-line grease interceptor assembly of claim 39, wherein said solids dam is attached to said opposed side walls of said chamber adjacent said lateral sides of said auxiliary baffle.

41. The in-line grease interceptor assembly of claim 38, wherein said outlet baffle opening extends substantially from opposed sides of said chamber adjacent said lateral sides of said auxiliary baffle.

42. The in-line grease interceptor assembly of claim 37, wherein said outlet baffle comprises a wall abutting said downstream end of said auxiliary baffle, spanning said first separation section and said second separation section.

43. The in-line grease interceptor assembly of claim 37, wherein said downstream end of said auxiliary baffle abuts said outlet baffle.

44. A method of preventing fat, oil, and grease (FOG) being carried out with wastewater mixed with said FOG from a food preparation establishment to a sewer system, said method comprising the steps of:
- receiving said mixed wastewater in a chamber through an inlet at an upstream end of said chamber, said chamber having lateral sides, a floor and an open top, and being adapted to maintain said mixed wastewater at a predetermined liquid level located below said open top while accumulating said separated FOG in a layer above said predetermined liquid level;
- positioning an auxiliary baffle inside said chamber, extending from a downstream end of said chamber toward an upstream end of said chamber, between said floor and said open top, said auxiliary baffle having a downstream end, an upstream end, and lateral sides, and defining a first separation section above said auxiliary baffle, and a second separation section below said auxiliary baffle;
- directing said mixed wastewater through said chamber along a sinuous flow path from said inlet to an outlet, via said first separation section and said second separation section;
- allowing at least some of said FOG to separate from said mixed wastewater in said first separation section to accumulate in said layer above said predetermined liquid level;
- blocking said separated FOG in said first separation section from entering said second separation section with said auxiliary baffle;
- directing said mixed wastewater from said second separation section toward said outlet at said downstream end of said chamber; and
- discharging said mixed wastewater through said outlet, after at least some of said FOG has been separated out from said mixed wastewater.

45. The method of claim 44, wherein at least some FOG remaining in said mixed wastewater in said second separation section is allowed to separate out from said mixed wastewater in said second separation section; and
- said method further comprising the step of allowing said separated FOG to pass through a portion of said auxiliary baffle, from said second separation section to said first separation section.

46. The method of claim 45, further comprising the step of concentrating a portion of said sinuous flow path in said first separation section away from said separated FOG passing through said portion of said auxiliary baffle from said second separation section in a column toward said accumulating FOG layer, with said auxiliary baffle.

47. The method of claim 44, further comprising the steps of:
- removing said auxiliary baffle from said chamber;
- cleaning said chamber and said auxiliary baffle; and
- installing said auxiliary baffle in said chamber.

* * * * *